(12) United States Patent
Catalena

(10) Patent No.: US 10,848,934 B1
(45) Date of Patent: *Nov. 24, 2020

(54) PASSIVE SENSOR TRACKING WITH EXISTING INFRASTRUCTURE

(71) Applicant: Troverlo, LLC, College Station, TX (US)

(72) Inventor: Cody William Catalena, College Station, TX (US)

(73) Assignee: TROVERLO, LLC, College Station, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/812,471

(22) Filed: Mar. 9, 2020

Related U.S. Application Data

(63) Continuation-in-part of application No. 16/570,195, filed on Sep. 13, 2019.

(51) Int. Cl.
  *H04W 24/00* (2009.01)
  *H04W 4/38* (2018.01)
  (Continued)

(52) U.S. Cl.
  CPC .............. *H04W 4/38* (2018.02); *H04W 48/10* (2013.01); *H04W 64/003* (2013.01); *H04W 84/12* (2013.01)

(58) Field of Classification Search
  CPC . H04W 12/06; H04W 12/0602; H04W 84/12; H04W 8/06; H04W 8/08;
  (Continued)

(56) References Cited

U.S. PATENT DOCUMENTS 8,433,334 B2   4/2013 Huang et al.
9,628,958 B1 * 4/2017 McBurney ............ H04W 4/027
(Continued)

OTHER PUBLICATIONS

USPTO non-final office action issued in U.S. Appl. No. 16/570,195, filed Sep. 13, 2019, dated Nov. 21, 2019.
(Continued)

*Primary Examiner* — Joseph Arevalo
(74) *Attorney, Agent, or Firm* — Basil M. Angelo; Angelo IP

(57) ABSTRACT

A method of passive sensor tracking with existing infrastructure includes associating unique identifying information of a Wi-Fi access point of a passive sensor with a physical property to be sensed by the passive sensor, where the Wi-Fi access point transmits a spoofed beacon frame, probe response frame, or other management frame as part of Wi-Fi wireless network discovery that includes sensor data. The method further includes receiving sensor data, including the physical property sensed by the passive sensor, in the spoofed beacon frame, probe response frame, or other management frame that the passive sensor transmits, as part of Wi-Fi wireless network discovery, to a wireless device that encounters the passive sensor, where the wireless device reports, either directly or indirectly, the unique identifying information of the Wi-Fi access point encountered and the sensor data in the spoofed beacon frame, probe response frame, or other management frame.

21 Claims, 20 Drawing Sheets

1400

(51) Int. Cl.
*H04W 64/00* (2009.01)
*H04W 48/10* (2009.01)
*H04W 84/12* (2009.01)

(58) Field of Classification Search
CPC . H04W 12/08; H04W 12/10; H04W 12/1006; H04W 12/12; H04W 12/1202; H04W 12/1204; H04W 76/14; H04W 8/005
USPC ......... 455/522, 434, 39, 411, 454, 450, 502, 455/404.2, 456.1, 424, 437, 418
See application file for complete search history.

(56) References Cited

U.S. PATENT DOCUMENTS

| | | | |
|---|---|---|---|
| 9,639,557 B2 | 5/2017 | Arslan et al. | |
| 10,217,078 B1 | 2/2019 | Klein | |
| 10,459,593 B2 | 10/2019 | Tiwari et al. | |
| 2006/0046709 A1 | 3/2006 | Krumm et al. | |
| 2010/0272093 A1* | 10/2010 | Raravi | H04L 1/1887 370/348 |
| 2014/0003286 A1* | 1/2014 | Estevez | H04W 48/02 370/254 |
| 2014/0050320 A1* | 2/2014 | Choyi | H04L 63/08 380/270 |
| 2014/0204926 A1 | 7/2014 | Ota et al. | |
| 2014/0355523 A1* | 12/2014 | Congdon | H04W 48/12 370/328 |
| 2015/0208454 A1 | 7/2015 | Cho et al. | |
| 2015/0312404 A1 | 10/2015 | Abramson et al. | |
| 2016/0066155 A1 | 3/2016 | Fan et al. | |
| 2016/0192374 A1* | 6/2016 | Negus | H04W 72/082 370/280 |
| 2017/0041862 A1* | 2/2017 | Chen | H04W 48/14 |
| 2017/0118530 A1* | 4/2017 | Amano | H04N 21/23805 |
| 2017/0219676 A1 | 8/2017 | Tran et al. | |
| 2018/0069650 A1 | 3/2018 | Tran et al. | |
| 2018/0295519 A1* | 10/2018 | Nandha Premnath | H04L 63/1425 |
| 2018/0322376 A1 | 11/2018 | Henry et al. | |
| 2019/0050806 A1 | 2/2019 | Klein | |
| 2019/0174289 A1* | 6/2019 | Martin | H04L 67/02 |

OTHER PUBLICATIONS

USPTO non-final office action issued in U.S. Appl. No. 16/812,612, filed Mar. 9, 2020, dated Apr. 8, 2020.
USPTO notice of allowance issued in U.S. Appl. No. 16/907,806, filed Jun. 22, 2020, dated Jul. 24, 2020.
USPTO Notice of Allowance for U.S. Appl. No. 16/570,195, filed Sep. 13, 2019, dated Apr. 30, 2020.

* cited by examiner

740

| Time | Date | GPS LAT | GPS LNG | SSID | BSSID | Signal Strength |
|------|------|---------|---------|------|-------|-----------------|
| 2:02 | 1-Sep | A | B | Asset1 | BSSID1 | 25% |
| 2:05 | 1-Sep | A++ | B-- | Asset1 | BSSID1 | 75% |
| 3:04 | 1-Sep | A++ | B- | Asset1 | BSSID1 | 95% |
| 4:23 | 1-Sep | C | D | Asset2 | BSSID2 | 56% |
| 9:59 | 2-Sep | E | F | Asset3 | BSSID3 | 45% |

| Time | Date | GPS LAT | GPS LNG | SSID | Asset | Signal Strength | AP LK LAT | AP LK LNG | AP CUR LAT | AP CUR LNG |
|------|------|---------|---------|------|-------|-----------------|-----------|-----------|------------|------------|
| 2:02 | 1-Sep | A | B | Asset1 | BSSID1 | 25% | A+ | B+ | A+ | B- |
| 2:05 | 1-Sep | A++ | B-- | Asset1 | BSSID1 | 75% | A+ | B- | A++ | B-- |
| 3:04 | 1-Sep | A++ | B- | Asset1 | BSSID1 | 95% | A++ | B-- | A++ | B- |
| 4:23 | 1-Sep | C | D | Asset2 | BSSID2 | 56% | C | D+ | C | D+ |
| 9:59 | 2-Sep | E | F | Asset3 | BSSID3 | 45% | E+ | F | E+ | F |

FIG. 7C

| Subtype Bits | Subtype Description |
|---|---|
| 0000 | Association Request |
| 0001 | Association Response |
| 0010 | Reassociation Request |
| 0011 | Reassociation Response |
| 0100 | Probe Request |
| *0101* | *Probe Response* |
| 0110 | Timing Advertisement |
| 0111 | Reserved |
| *1000* | *Beacon* |
| 1001 | Announcement Traffic Indication Message (ATIM) |
| 1010 | Dissociation |
| 1011 | Authentication |
| 1100 | Deauthentication |
| 1101 | Action |
| 1110 | Action No Ack (NACK) |
| 1111 | Reserved |

PASSIVE SENSOR TRACKING WITH EXISTING INFRASTRUCTURE

CROSS-REFERENCE TO RELATED APPLICATIONS

This application is a continuation-in-part of U.S. patent application Ser. No. 16/570,195, filed on Sep. 13, 2019, which is hereby incorporated by reference in its entirety.

BACKGROUND OF THE INVENTION

Wireless networking refers to the wireless exchange of information between network nodes with electromagnetic signaling, typically in the radio spectrum. Standards setting organizations, such as the Institute of Electrical and Electronics Engineers ("IEEE"), coordinate, develop, promulgate, and maintain technical standards that facilitate implementation of wireless network standards that ensure compatibility between competing original equipment manufacturers and thereby seek to achieve widespread adoption of their respective technologies. The ubiquitous IEEE 802.11 standard specifies a Wireless Local Area Network ("WLAN") technology, commonly referred to as Wi-Fi, that facilitates wireless communication between devices and often serves as a bridge to a network carrying Internet Protocol ("IP") traffic. Wi-Fi typically operates at either 2.4 GHz or 5 GHz frequency bands in the radio portion of the electromagnetic spectrum.

In its first iterations, the IEEE 802.11a/b standards specified transfer rates of up to 11 Mbps at a range of up to 150 feet. The IEEE 802.11g amendment implemented various improvements, including Orthogonal Frequency Division Multiplexing ("OFDM"), to increase transfer rates to up to 54 Mbps while maintaining backward compatibility with IEEE 802.11b. The IEEE 802.11n amendment added Multiple Input Multiple Output ("MIMO") functionality where multiple transmitters and receivers operate simultaneously at one or both ends of the link to facilitate transfer rates of up to 300 Mbps and even higher if additional antennae are used. The IEEE 802.11ac amendment added support for spatial streams and increased channel widths to substantially increase transfer rates from 433 Mbps to several Gbps and works exclusively in the less crowded 5 GHz frequency band and at a range of up to 300 feet or more.

The IEEE 802.11 standard remains an evolving technical standard and future amendments will likely seek to increase transfer rates, improve connectivity in challenging environments, and enhance security. As such, Wi-Fi remains the most widely adopted wireless networking standard in the world and will likely remain so for the foreseeable future.

BRIEF SUMMARY OF THE INVENTION

According to one aspect of one or more embodiments of the present invention, a method of passive sensor tracking with existing infrastructure includes associating unique identifying information of a Wi-Fi access point of a passive sensor with a physical property to be sensed by the passive sensor, wherein the Wi-Fi access point transmits a spoofed beacon frame, probe response frame, or other management frame as part of Wi-Fi wireless network discovery that includes sensor data and receiving sensor data, including the physical property sensed by the passive sensor, in the spoofed beacon frame, probe response frame, or other management frame that the passive sensor transmits, as part of Wi-Fi wireless network discovery, to a wireless device that encounters the passive sensor. The wireless device reports, either directly or indirectly, the unique identifying information of the Wi-Fi access point encountered and the sensor data in the spoofed beacon frame, probe response frame, or other management frame and the wireless device is not required to authenticate to, associate with, or establish a network connection with the Wi-Fi access point of the passive sensor.

According to one aspect of one or more embodiments of the present invention, a non-transitory computer readable medium comprising software instructions that, when executed by a processor, perform a method of passive sensor tracking with existing infrastructure that includes associating unique identifying information of a Wi-Fi access point of a passive sensor with a physical property to be sensed by the passive sensor, wherein the Wi-Fi access point transmits a spoofed beacon frame, probe response frame, or other management frame as part of Wi-Fi wireless network discovery that includes sensor data and receiving sensor data, including the physical property sensed by the passive sensor, in the spoofed beacon frame, probe response frame, or other management frame that the passive sensor transmits, as part of Wi-Fi wireless network discovery, to a wireless device that encounters the passive sensor. The wireless device reports, either directly or indirectly, the unique identifying information of the Wi-Fi access point encountered and the sensor data in the spoofed beacon frame, probe response frame, or other management frame and the wireless device is not required to authenticate to, associate with, or establish a network connection with the Wi-Fi access point of the passive sensor.

According to one aspect of one or more embodiments of the present invention, a system for passive sensor tracking with existing infrastructure includes a computing system and a sensor tracking database, executing on the computing system, that associates unique identifying information of a Wi-Fi access point of a passive sensor with a physical property to be sensed by the passive sensor, wherein the Wi-Fi access point transmits a spoofed beacon frame, probe response frame, or other management frame that include sensor data as part of Wi-Fi wireless network discovery. The sensor tracking database receives sensor data, including the physical property sensed by the passive sensor, in a spoofed beacon frame, probe response frame, or other management frame that the passive sensor transmits, as part of Wi-Fi wireless network discovery, to a wireless device that encounters the passive sensor, and the wireless device reports, either directly or indirectly, the unique identifying information of the Wi-Fi access point encountered and the sensor data in the spoofed beacon frame, probe response frame, or other management frame, by way of location services, to the sensor tracking database and the wireless device is not required to authenticate or associate with the Wi-Fi access point of the passive sensor.

According to one aspect of one or more embodiments of the present invention, a passive sensor for passive sensor tracking with existing infrastructure includes a sensor that senses a physical property and outputs a sensor signal comprising sensor data corresponding to the physical property sensed, a sensor interface that inputs the sensor signal and generates a spoofed management frame including sensor data corresponding to the physical property sensed, and a Wi-Fi access point that transmits the spoofed beacon frame, probe response frame, or other management frame as part of Wi-Fi wireless network discovery.

Other aspects of the present invention will be apparent from the following description and claims.

BRIEF DESCRIPTION OF THE DRAWINGS

FIG. 7B shows exemplary data reported by a wireless device relating to discovered Wi-Fi access points in accordance with one or more embodiments of the present invention.

FIG. 7C shows exemplary data stored or generated by an asset tracking database in accordance with one or more embodiments of the present invention.

DETAILED DESCRIPTION OF THE INVENTION

Figure 1:
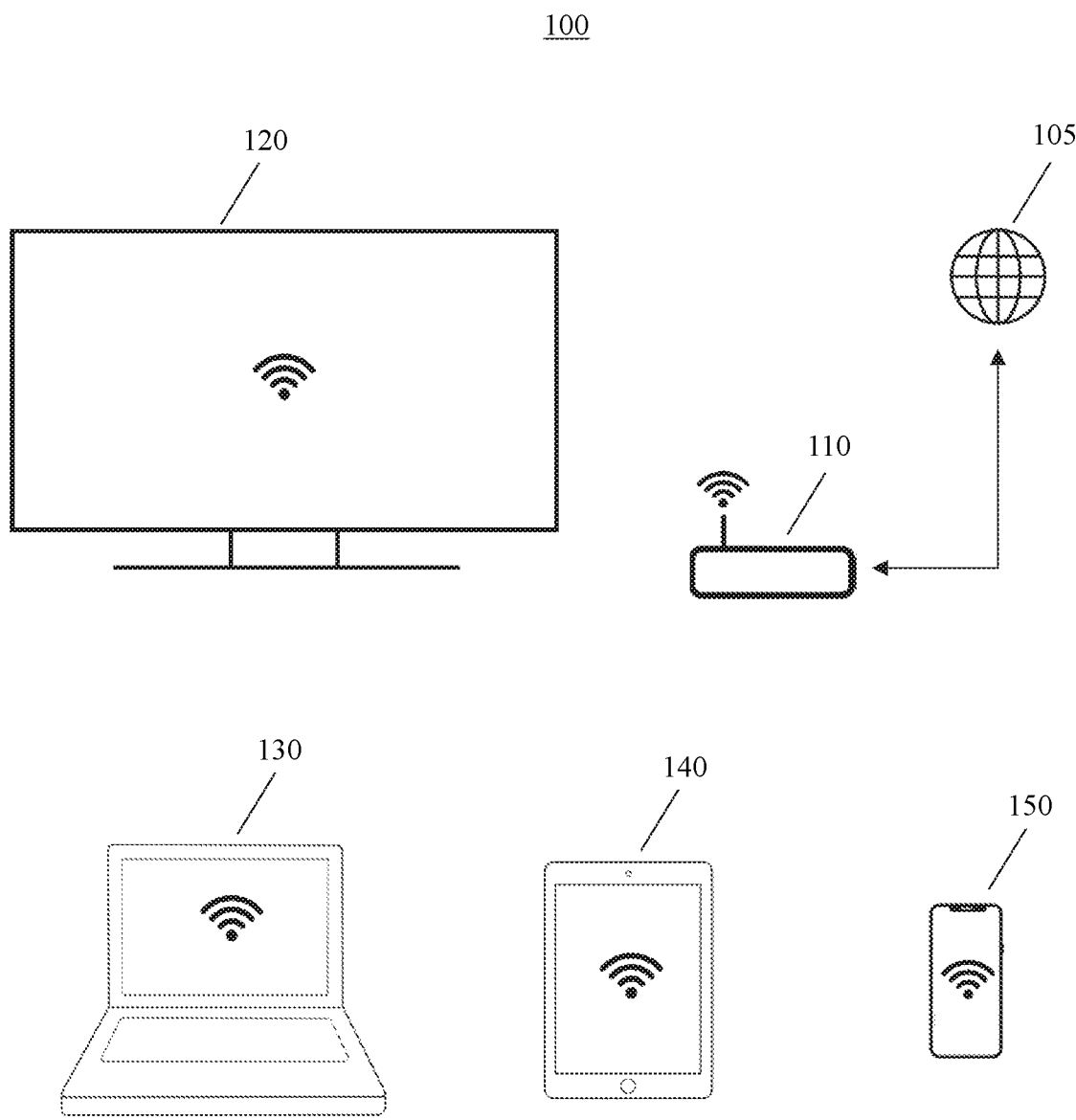
FIG. 1 shows a conventional Wi-Fi wireless network.

One or more embodiments of the present invention are described in detail with reference to the accompanying figures. For consistency, like elements in the various figures are denoted by like reference numerals. In the following detailed description of the present invention, specific details are set forth in order to provide a thorough understanding of the present invention. In other instances, well-known features to one of ordinary skill in the art are not described to avoid obscuring the description of the present invention.

Conventional asset tracking systems use dedicated and complicated hardware and software systems to track physical assets, typically within the confines of a fixed location or from portal-to-portal of one or more fixed locations. Conventional asset tracking systems typically use, for example, barcode, Near-Field Communication ("NFC"), Bluetooth Low Energy ("BLE"), Radio-Frequency Identification ("RFID") tags, and Global Positioning System ("GPS") to tag and affirmatively track assets within their respective asset tracking system. In typical applications, the asset tracking task is knowingly and actively performed by dedicated hardware and software systems intentionally deployed for the asset tracking task. As such, an inherent limitation in conventional asset tracking systems is the requirement that the tagging, tracking, hardware, and software systems must be intentionally deployed, span the zone of coverage, and knowingly and actively perform and manage the asset tracking task. This requires extensive investment in expensive hardware and software systems and in hiring and training personnel on its usage. Moreover, in a widespread deployment of assets across many sites, perhaps even around the world, it is exceptionally difficult and cost prohibitive to deploy and manage a coherent conventional asset tracking system.

Accordingly, in one or more embodiments of the present invention, a method and system of passive asset tracking with existing infrastructure allows for passively tracking moveable assets by one or more wireless devices that happen to come in-range of Wi-Fi access point signals even though the wireless device, or user thereof, may not even know they are participating in the asset tracking task. In this way, the community of smartphones that happen to be in the vicinity of an asset that is desired to be tracked may, anonymously, and without awareness, participate in the asset tracking task. By using this existing infrastructure, moveable assets may be passively tracked by one or more unrelated wireless devices whenever the one or more of the wireless devices merely come into range of one or more assets associated with a Wi-Fi access point broadcasting Wi-Fi signals, without any intent or awareness on the part of the wireless device, or user thereof, that they are participating in the asset tracking task due to the nature of the Wi-Fi wireless network discovery protocol. In addition, the method and system leverage existing infrastructure inherent in smartphones and smartphone operating systems to report their location, as well as the unique identifying information of Wi-Fi access points they encounter, typically for improving the accuracy of location-based services. Advantageously, the Wi-Fi wireless network discovery protocol as well as the Wi-Fi access point reporting feature of smartphones may be cooperatively used to passively track assets associated with Wi-Fi access points by one or more wireless devices without requiring that the wireless devices authenticate to, or associate with, any particular Wi-Fi access point, using publicly accessibly Wi-Fi signals, and in passive scanning applications, completely anonymously with respect to the asset tracking task.

FIG. 1 shows a conventional Wi-Fi wireless network 100. A conventional Wi-Fi wireless network 100 typically includes a broadband modem 105 that provides high-speed Internet connectivity to one or more wireless devices (e.g., 120, 130, 140, and 150) via a Wi-Fi access point 110. Wi-Fi access point 110 typically facilitates wireless connectivity between one or more of the wireless devices and, in configurations that include an integrated router, may serve as the bridge between the wireless devices (e.g., 120, 130, 140, and 150) and an upstream network connection, such as, for example, the Internet connection, provided by broadband modem 105. In conventional use, a wireless connection may be established between one or more wireless devices (e.g., 120, 130, 140, and 150), including, for example, a television 120, computer 130, tablet computer 140, smartphone 150, or any other wireless device, and Wi-Fi access point 110, thereby allowing the wireless devices (e.g., 120, 130, 140, and 150) to communicate with one another and access the Internet via broadband modem 105. Wi-Fi access points 110 are commonly found in homes, offices, and public places, where they are often referred to as Wi-Fi hotspots. While the number of Wi-Fi access points 110 has not been definitively counted, there are believed to be in excess of one billion Wi-Fi access points 110 around the world. Efforts to map Wi-Fi signal coverage suggest that most modern cities are blanketed with publicly accessible Wi-Fi signals. Notwithstanding the above, one of ordinary skill in the art will recognize that a conventional Wi-Fi network 100 does not require a broadband modem 105 or Internet connectivity and may be used as a purely wireless network to facilitate wireless communications between one or more wireless devices (e.g., 120, 130, 140, and 150).

Figure 2:
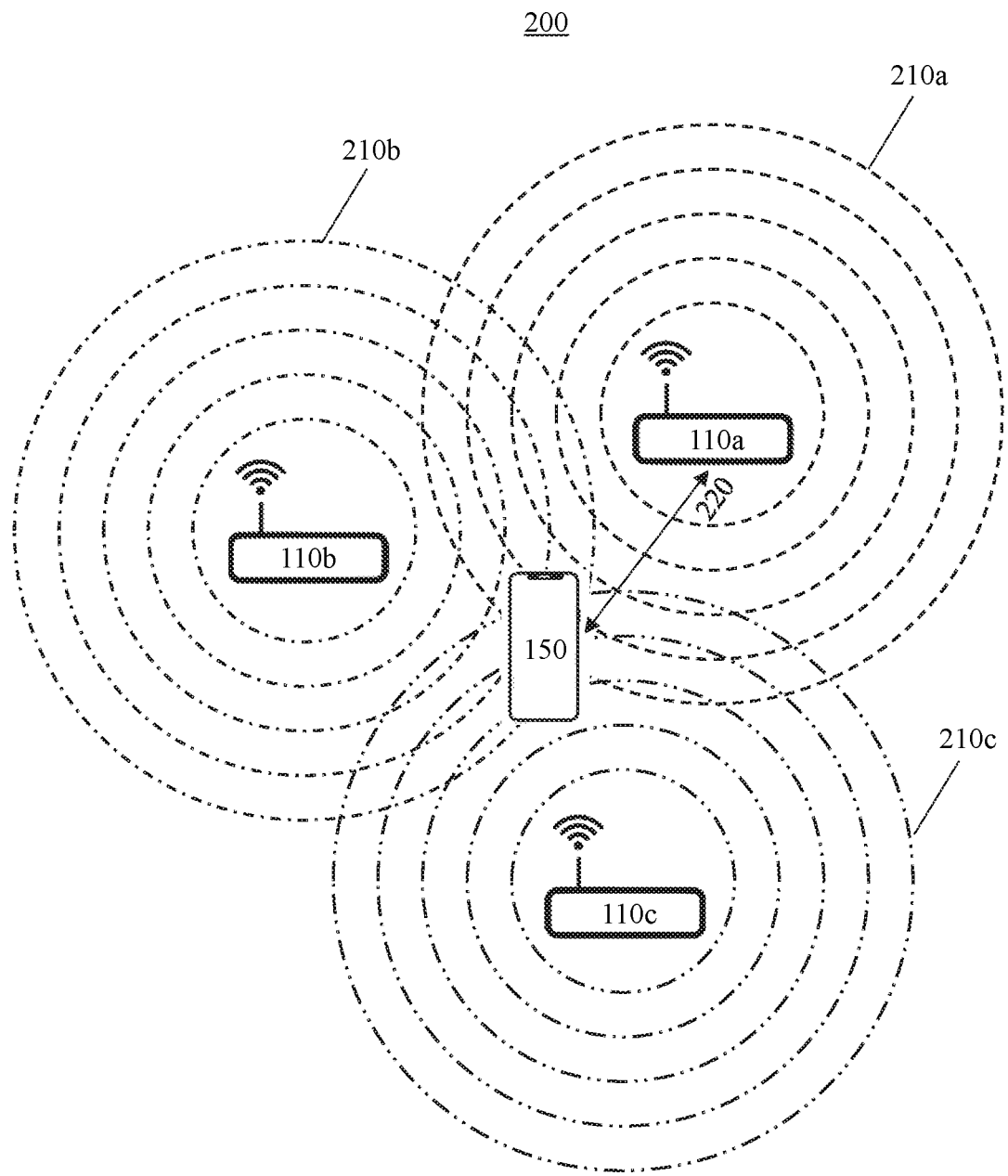
FIG. 2 shows passive scanning mode as part of Wi-Fi wireless network discovery.

FIG. 2 shows passive scanning mode 200 as part of Wi-Fi wireless network discovery. Wi-Fi wireless network discovery is the process by which a wireless device identifies and potentially authenticates to, and associates with, an in-range Wi-Fi access point 110. In passive scanning mode, one or more wireless devices 150 listen for beacon frames broadcast 210 at periodic intervals by one or more in-range Wi-Fi access points 110 to announce the presence of their respective wireless networks. Beacon frames are a type of management frame that includes information regarding the broadcasting Wi-Fi access point 110 to facilitate potential authentication, association, and connectivity. Each beacon frame includes a Service Set Identifier ("SSID"), which is typically a user-given name for the broadcasting Wi-Fi wireless network, and information that uniquely identifies the Wi-Fi access point 110 including, but not limited to, a Basic Service Set Identifier ("BSSID"), which is a unique Media Access Control ("MAC") address of the Wi-Fi access point 110 or a broadcasting band thereof. Multiple Wi-Fi access points 110 may share the same SSID as part of the same wireless network, but each Wi-Fi access point 110 will have a unique BSSID. Moreover, dual or multi-band Wi-Fi access points 110 that broadcast on multiple frequency bands, typically have a unique BSSID for each frequency band that they broadcast on.

A wireless device (e.g., smartphone 150) may be statically or transiently located within the broadcast range of one or more Wi-Fi access points (e.g., 110a, 110b, and 110c). Each Wi-Fi access point 110 may periodically broadcast their beacon frame (e.g., 210a, 210b, and 210c) announcing the presence of their respective Wi-Fi wireless network. Wireless device 150 may listen to, and receive, beacon frames from the in-range Wi-Fi access points (e.g., 110a, 110b, and 110c). In conventional applications, a user of wireless device 150 may optionally select, on their device, the SSID of the Wi-Fi access point, i.e., 110a, of the Wi-Fi wireless network that they wish to join and then communicate 220 with the Wi-Fi access point 110a to establish wireless connectivity. It is important to note that, passive scanning 200 is completely anonymous with respect to wireless devices 150 that receive the beacon frames of in-range Wi-Fi access points 110 until such time that they choose to authenticate to, and associate with, a particular Wi-Fi access point 110. Unless and until a user of a wireless device 150 selects a specific Wi-Fi access point 110 and network thereof to authenticate to, and associate with, wireless device 150 may passively receive the Wi-Fi signals being publicly broadcast and remain completely anonymous.

Figure 3:
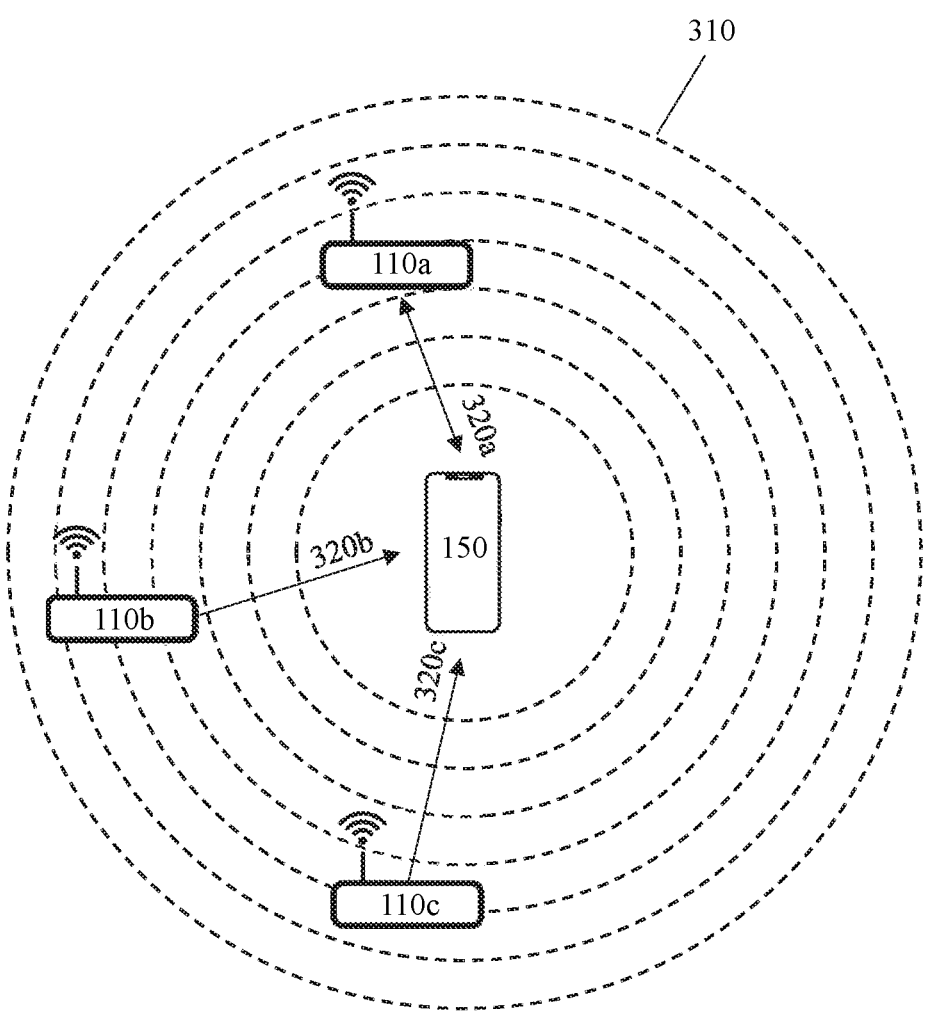
FIG. 3 shows active scanning mode as part of Wi-Fi wireless network discovery.

FIG. 3 shows active scanning mode 300 as part of Wi-Fi wireless network discovery. In contrast to passive scanning mode, active scanning is a type of Wi-Fi wireless network discovery process where a wireless device 150 broadcasts a probe request frame 310 to a specific (not shown) or all Wi-Fi access points (e.g., 110a, 110b, and 110c) that are within range. A probe request frame is a type of management frame that may include information about the specific Wi-Fi access point (e.g., 110a) that the wireless device 150 wishes to authenticate to, and associate with, sometimes referred to as a directed probe request, or may be directed to all available Wi-Fi access points 110 within range, sometimes referred to as a null probe request. Responding in-range Wi-Fi access points 110a, 110b, and 110c transmit a probe response frame 320a, 320b, and 320c that includes information substantially similar to a beacon frame including their respective SSID and unique BSSID.

In contrast to passive scanning (e.g., 200) where each Wi-Fi access point 110 broadcasts its respective beacon frames on a specific channel, in active scanning (e.g., 300), wireless device 150 may broadcast probe request frames 310 across all available channels for the associated frequency band. In this way, wireless device 150 may, for example, select a Wi-Fi access point 110 that provides the strongest signal strength and quality. Moreover, even when a particular wireless device 150 is authenticated to, and associated with, a specific Wi-Fi access point (e.g., 110a), wireless device 150 may go off channel and continue to send probe request frames 310 on other channels. By continuing to actively probe for Wi-Fi access points 110, wireless device 150 may maintain a list of known Wi-Fi access points 110 that may facilitate roaming should the wireless device 150 move out of range of the currently associated Wi-Fi access point 110. In contrast to passive scanning (e.g., 200), active scanning operations 300 only require a wireless device 150 to send a probe request on a specific channel within the designated frequency band and then listen for a comparatively smaller amount of time as compared to passive scanning (e.g., 200). As such, active scanning 300 presents a more directed approach to wireless network discovery as compared to passive scanning operations (e.g., 200).

Figure 4:
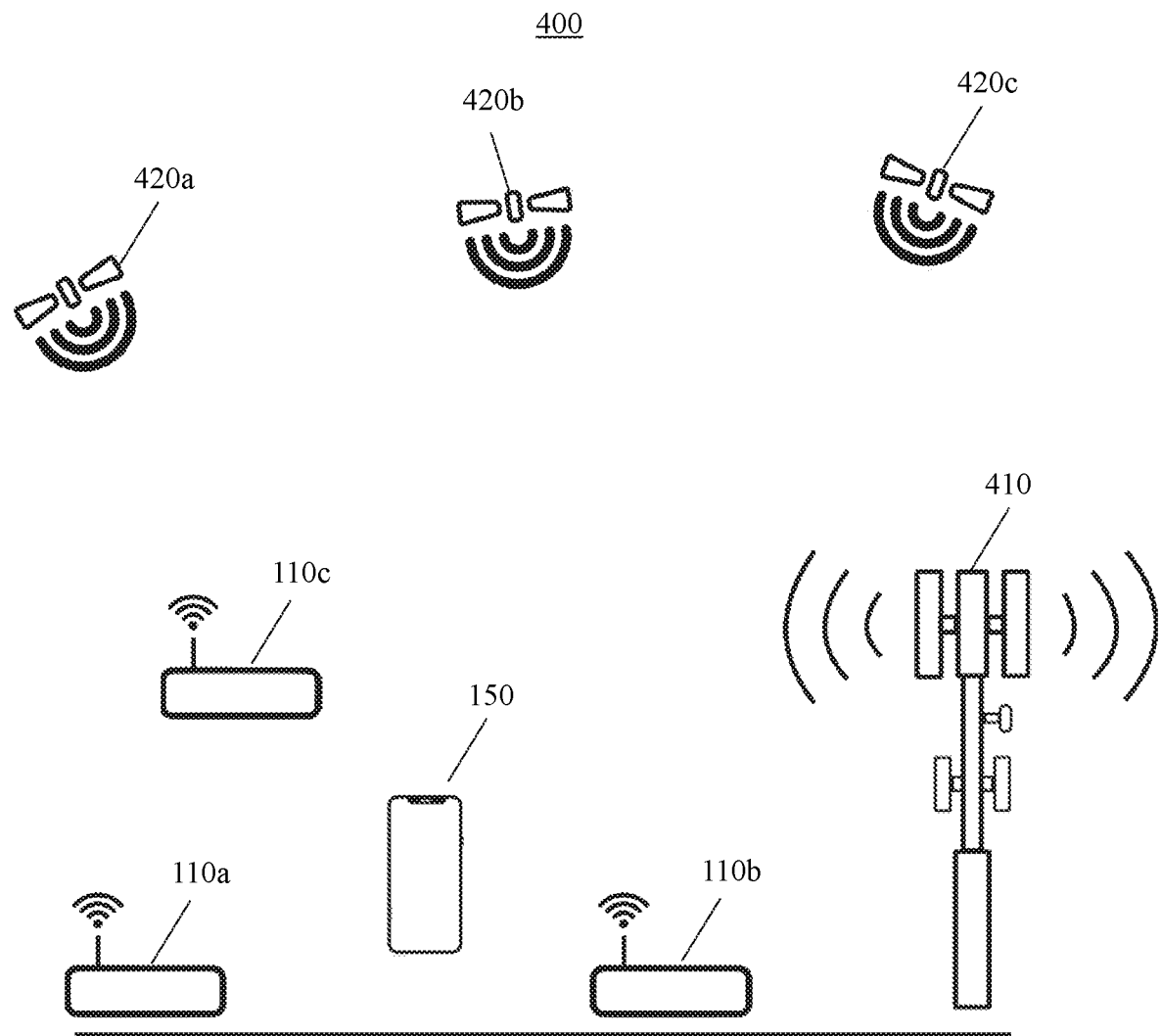
FIG. 4 shows various wireless networking technologies used to determine a location of a wireless device and Wi-Fi access points.

FIG. 4 shows how various wireless networking technologies may be used to determine a location of a wireless device 150 and one or more Wi-Fi access points 110. Wireless device 150, which may be a smartphone as depicted or any other type or kind of wireless device, may establish a cellular connection with one or more cell towers 410 providing cellular network connectivity. An established connection to a particular cell tower 410 may, in some circumstances, be used to establish a location of wireless device 150 within a determinable radius of the particular cellular tower 410. Further, patterns of connectivity to one or more cell towers 410 may be used to establish a location, or potentially even the movement, of wireless device 150 within a determinable radius. However, these techniques are rarely used outside of law enforcement.

Instead, wireless devices 150 typically rely on GPS signals to determine their location. Most wireless devices 150 include a GPS receiver (not independently shown) capable of receiving one or more GPS signals (not shown) from one or more GPS satellites (e.g., 420a, 420b, and 420c) in Earth orbit. Typically, there are at least four GPS satellites 420 visible to a wireless device 150 no matter where it is located, anywhere around the globe. Each GPS satellite 420 transmits a GPS signal (not shown) that includes information about the satellite's current position and the current time at regular intervals. The GPS receiver of wireless device 150 receives one or more of these GPS signals and calculates how far away it is from each satellite based on how long it took for each respective GPS signal to arrive. If the wireless device 150 receives the GPS signal from at least three GPS satellites 420, the location of the wireless device 150 may be determined with a high degree of accuracy by a process referred to as trilateration. The GPS derived location of wireless device 150 may be determined continuously, periodically, or upon the execution of software that requires location services, such as, for example, navigation software or a web browser used to search nearby places. The accuracy of GPS is within a radius of approximately 16 feet under open skies and good conditions but worsens near structures and obstructions.

As such, a wireless device 150 may use one or more in-range Wi-Fi access points (e.g., 110a, 110b, or 110c) to improve the accuracy of the GPS location determination and, in instances when GPS is not available, determine its location based on Wi-Fi alone. As part of the Wi-Fi wireless network discovery process, wireless device 150 typically determines the signal strength of the Wi-Fi signals broadcast by the in-range Wi-Fi access points (e.g., 110a, 110b, or 110c). Assuming, for the purpose of this discussion, that the location of one or more Wi-Fi access points (e.g., 110a, 110b, or 110c) are already known to a certain degree of accuracy, the signal strengths may be used to refine the accuracy of the GPS location determination and, in instances when GPS is not available, determine the location of the wireless device 150 based on Wi-Fi alone. For example, the known location of a Wi-Fi access point (e.g., 110a) and the signal strength of the Wi-Fi signal received from it may be used in conjunction with the signal strength and known location of other Wi-Fi access points (e.g., 110b and 110c) to refine or determine the location of wireless device 150 by a process referred to as triangulation. It is important to note that the signal strength of the Wi-Fi signals received by wireless device 150 from one or more Wi-Fi access points 110 are determined without requiring wireless device 150 to authenticate to, or associate with, or otherwise join any particular Wi-Fi access point (e.g., 110a, 110b, or 110c). As such, wireless device 150 may use publicly broadcast Wi-Fi signals of in-range Wi-Fi access points 110 that it does not use or otherwise associate with in any way.

Above, an assumption was made that the location of one or more Wi-Fi access points 110 were known to a certain degree of accuracy. This assumption holds true because wireless devices 150 report in-range Wi-Fi access points 110 they encounter as well as their current location to the original equipment manufacturer, operating system developer, or other third-party who maintain a database, sometimes referred to herein as a Wi-Fi AP Database, typically to improve the accuracy of location determination as well as other location-related services (i.e., significant locations, location-based suggestions, location-based alerts, popular near me, and the like). While this benefits the user of wireless device 150 in providing improved services, each wireless device 150 discovers the existence, and reports the location, of Wi-Fi access points 110 it encounters on an ongoing continuous basis, typically without awareness on the part of the user. This is commonly performed as part of, for example, iOS® and Android® location services and it is generally available to third-party software developers for their use. In addition, many public and private companies maintain a centralized database that contains the identifying information and location of known Wi-Fi access points 110. It is important to note that this information stored in such databases is typically obtained anonymously through publicly accessible Wi-Fi access point signals and in accordance with the terms and conditions of use of most smartphones, that typically provide the user with the option of opting-out of participation in such services.

Figure 5:
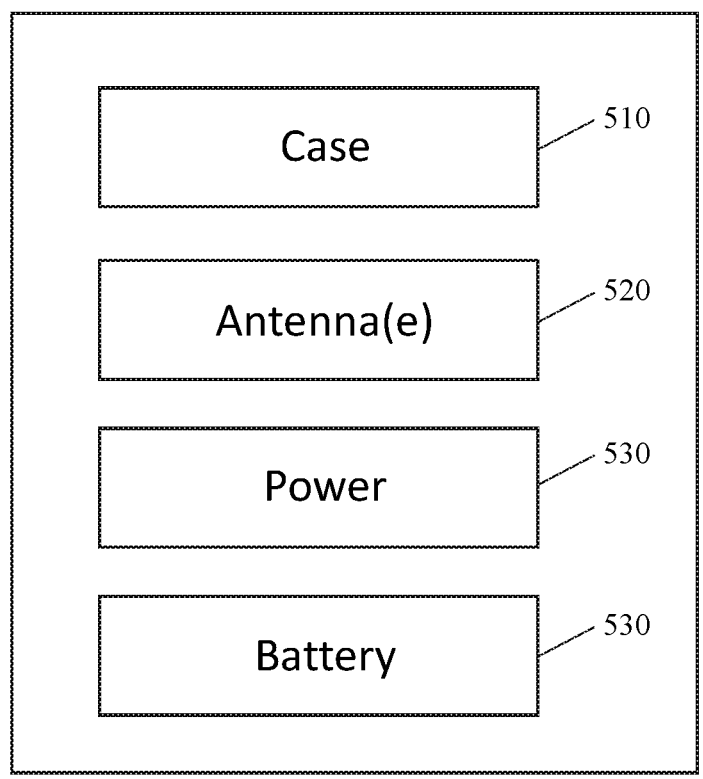
FIG. 5 shows a block diagram of a conventional Wi-Fi access point.

FIG. 5 shows a block diagram of a conventional Wi-Fi access point 110. A conventional Wi-Fi access point 110 includes a printed circuit board and related components (not shown) disposed within a casing or enclosure 510, which may be integrated into other devices or equipment depending on the application or design. Wi-Fi access point 110 typically includes one or more antennae 520 for transmitting and receiving radio frequency Wi-Fi signals, and a power source 530. In conventional applications, power source 530 is traditionally a DC power input, however, some industrial and commercial applications may use AC power input, and still other applications may use battery-powered power input. Wi-Fi access point 110 may or may not include an integrated router (not shown) and the associated connectivity. As such, in certain embodiments, Wi-Fi access point 110 may consist of a pure wireless access point that does not include a router and does not provide any bridge functionality to reduce the size, complexity, and power consumption of the device. In other embodiments, Wi-Fi access point (e.g., 1700 of FIG. 16) may not even function as an access point, but spoof aspects of the Wi-Fi wireless network discovery protocol, transmitting beacon frames, probe response frames, or other management frames as if it was a functional Wi-Fi access point 110. Notwithstanding the above, one of ordinary skill in the art will recognize that any Wi-Fi access point 110, dummy Wi-Fi access point (e.g., 1700 of FIG. 16), or other device capable of participating in the Wi-Fi wireless network discovery protocol as if it were a bona fide Wi-Fi access point 110 may be used in accordance with one or more embodiments of the present invention.

Figure 6:
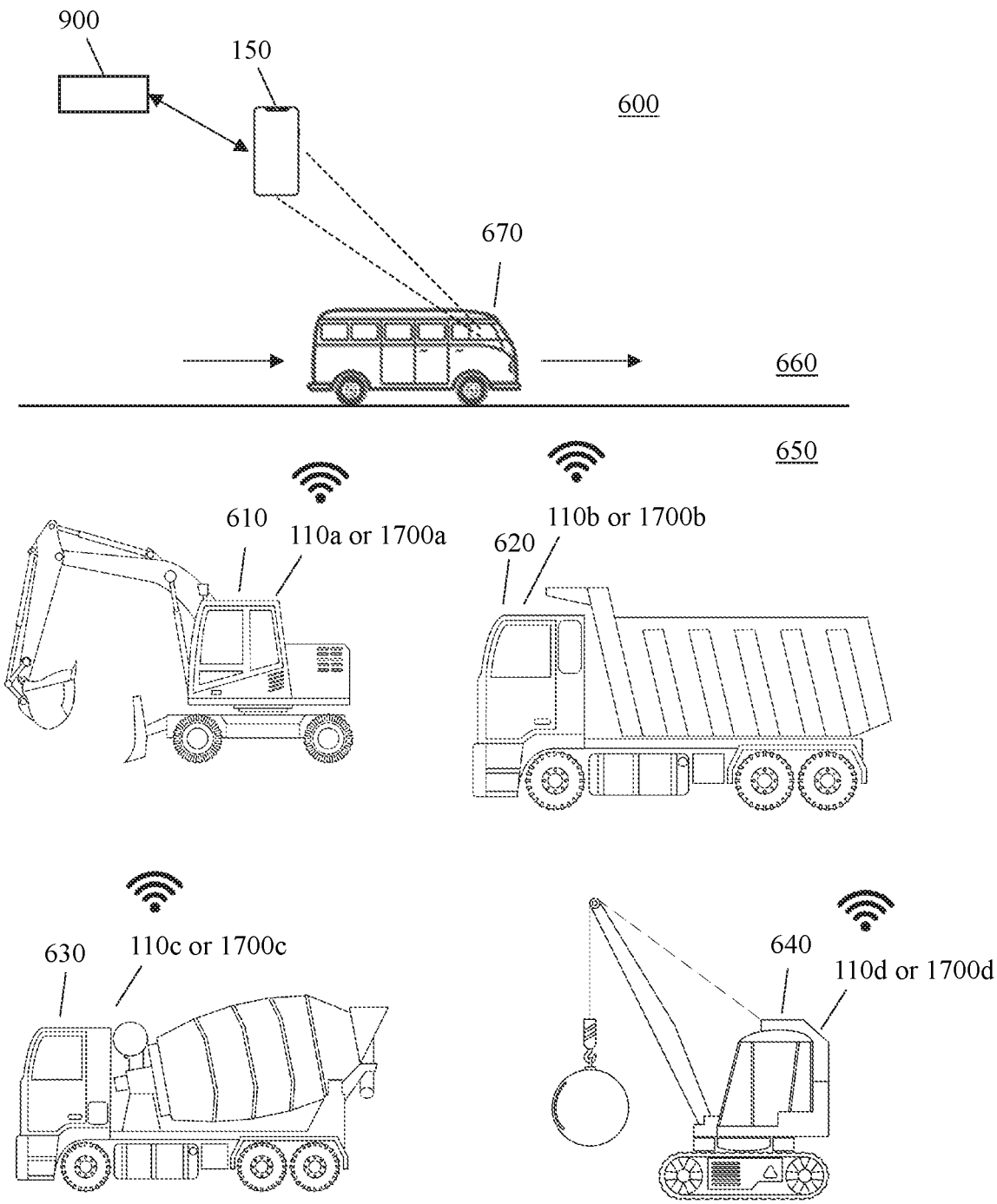
FIG. 6 shows an exemplary application of passive asset tracking with existing infrastructure in accordance with one or more embodiments of the present invention.

FIG. 6 shows an exemplary application of passive asset tracking with existing infrastructure 600 in accordance with one or more embodiments of the present invention. Specifically, in one or more embodiments of the present invention, one or more assets may be passively tracked by one or more wireless devices 150, or Wi-Fi clients, that are in-range, or even come in and go out of range, of assets that broadcast Wi-Fi signals even though a wireless device 150, or user thereof, may not even know that they are participating in the asset tracking task. As such, for the purpose of this disclosure, passive asset tracking means tracking an asset indirectly without requiring any particular wireless device 150 to authenticate to, or associate with, any particular Wi-Fi access point 110 or dummy version of Wi-Fi access point 1700. Accordingly, in certain embodiments, assets may be passively tracked by one or more wireless devices 150 that merely happen to come in-range of one or more assets broadcasting Wi-Fi access point signals even though a wireless device 150, or user thereof, may or may not be aware that they are taking part in the asset tracking task. In other embodiments, one or more wireless devices 150 may passively track assets in a purposeful manner, whereby a wireless device 150 intentionally interacts with one or more Wi-Fi access points 110 or dummy Wi-Fi access points 1700 associated with assets deployed in the field 650. In all such embodiments, the Wi-Fi wireless network discovery process may be advantageously used by one or more wireless devices 150 to passively track assets without requiring that they authenticate to, associate with, or join any particular Wi-Fi access point 110 or dummy Wi-Fi access point 1700, using publicly accessible Wi-Fi signals, and in passive scanning applications, anonymously with respect to the asset tracking task.

Returning to the figure, in one or more embodiments of the present invention, one or more Wi-Fi access points (e.g., 110a/1700a, 110b/1700b, 110c/1700c, and 110d/1700d) may be disposed, or otherwise attached to, or even integrated with, one or more moveable assets (e.g., 610, 620, 630, and 640) that may be deployed in the field 650. For the purpose of illustration only, construction equipment (e.g., 610, 620, 630, and 640) is shown in the figure as exemplars of moveable assets to be tracked. However, one of ordinary skill in the art will recognize that any asset may be tracked in accordance with one or more embodiments of the present invention. The Wi-Fi access points 110/1700 are not required to authenticate to, associate with, or otherwise join any particular wireless network or any wireless network at all, as the Wi-Fi access points 110/1700 may be used for the sole purpose of uniquely identifying an asset that is desired to be tracked. Specifically, each Wi-Fi access point 110/1700 disposed on, or otherwise attached to, or even integrated with, an asset (e.g., 610, 620, 630, and 640) may broadcast beacon frames (not shown) in passive scanning mode and/or respond to probe request frames (not shown) as part of active scanning mode, where either the beacon frame (not shown) or probe response frame (not shown) includes information that uniquely identifies the Wi-Fi access point/dummy Wi-Fi access point 110/1700, and, to those who recognize the association by proxy with a particular asset (e.g., 610, 620, 630, and 640), the asset itself. One of ordinary skill in the art will recognize that the beacon frame, probe response frame, or other management frame may contain other information that may be customized or helpful to the asset tracking task.

In certain embodiments, in passive scanning mode, the Wi-Fi access points (e.g., 110a/1700a, 110b/1700b, 110c/1700c, and 110d/1700d) physically and logically associated with assets (e.g., 610, 620, 630, and 640) may broadcast beacon frames (not shown) at regular intervals, each of which includes information that uniquely identifies the particular Wi-Fi access point 110/1700 and, to those who recognize the association, by proxy the asset (e.g., 610, 620, 630, and 640) associated with it. One or more wireless devices 150 may come in-range of one or more Wi-Fi access points 110/1700 and receive one or more beacon frames. As previously discussed, wireless devices 150 report, via a cellular or other connection, information such as, for example, the time, the date, its current location, its speed, or direction of travel, as well as the SSID and BSSID of in-range Wi-Fi access points 110/1700 encountered to a computing system 800 of an original equipment manufacturer of the wireless device 150, an operating system developer (not shown), third-party software developer (not shown), or a dedicated asset tracking system of the present invention (not shown) that tracks assets. While the encounter reporting feature of wireless devices 150 is typically used to improve the accuracy of location-based services, here, the reporting feature provides, clandestinely, an estimate of the location of one or more Wi-Fi access points 110/1700 at a particular time and date without requiring the purposeful participation of any particular wireless device 150 in any particular Wi-Fi wireless network. This information may be used to determine the location of one or more Wi-Fi access points 110/1700 and, by proxy, one or more assets (e.g., 610, 620, 630, and 640) with substantial accuracy, that may be further refined with well-known Wi-Fi access point triangulation processes typically used by wireless devices 150 to refine GPS accuracy or improve location services.

In other embodiments, in active scanning mode, one or more wireless devices 150 may transmit a probe request frame (not shown) that is not directed to any particular Wi-Fi access point, requesting that all Wi-Fi access points 110, including dummy Wi-Fi access points 1700, in range announce their presence. In response, in-range Wi-Fi access points 110/1700 may transmit a probe response frame which includes information that uniquely identifies the responding Wi-Fi access point 110/1700 and, to those who recognize the association, the asset (e.g., 610, 620, 630, and 640) associated with it. As previously discussed, wireless devices 150 report, via a cellular or other connection, information such as, for example, the time, the date, its current location, its speed, or direction of travel, as well as the SSID and BSSID of in-range Wi-Fi access points 110/1700 encountered to a computing system 800 of an original equipment manufacturer (not shown) of the wireless device 150, an operating system developer (not shown), third-party software developer (not shown), or a dedicated asset tracking system of the present invention (not shown) that tracks assets.

While a single wireless device 150 is depicted in the figure, one of ordinary skill in the art will recognize that any number of wireless devices 150 may come in and out of range of the assets (e.g., 610, 620, 630, and 640) over time, each of which independently reports the time, the date, their location, and the SSID and BSSID of in-range Wi-Fi access points 110/1700 as they are encountered (and other information that may be useful to the asset tracking task). In fact, the tracking accuracy may improve as a function of the number of unique identifications that take place over time, or potentially provide additional information such as movement of assets (e.g., 610, 620, 630, and 640) throughout the day, or the speeds at which they are moving, or even when they leave a boundary of the job site 650. While wireless device 150 is depicted as being disposed in a motor vehicle 670 driving 660 by a job site 650, one of ordinary skill in the art will recognize that wireless device 150 may be stationary or conveyed by any means conceived of so long as it is capable of participating in Wi-Fi wireless network discovery and thereby identifying, reporting, and effectively locating assets (e.g., 610, 620, 630, and 640) indirectly by reporting the Wi-Fi access points 110/1700 encountered.

Figure 7A:
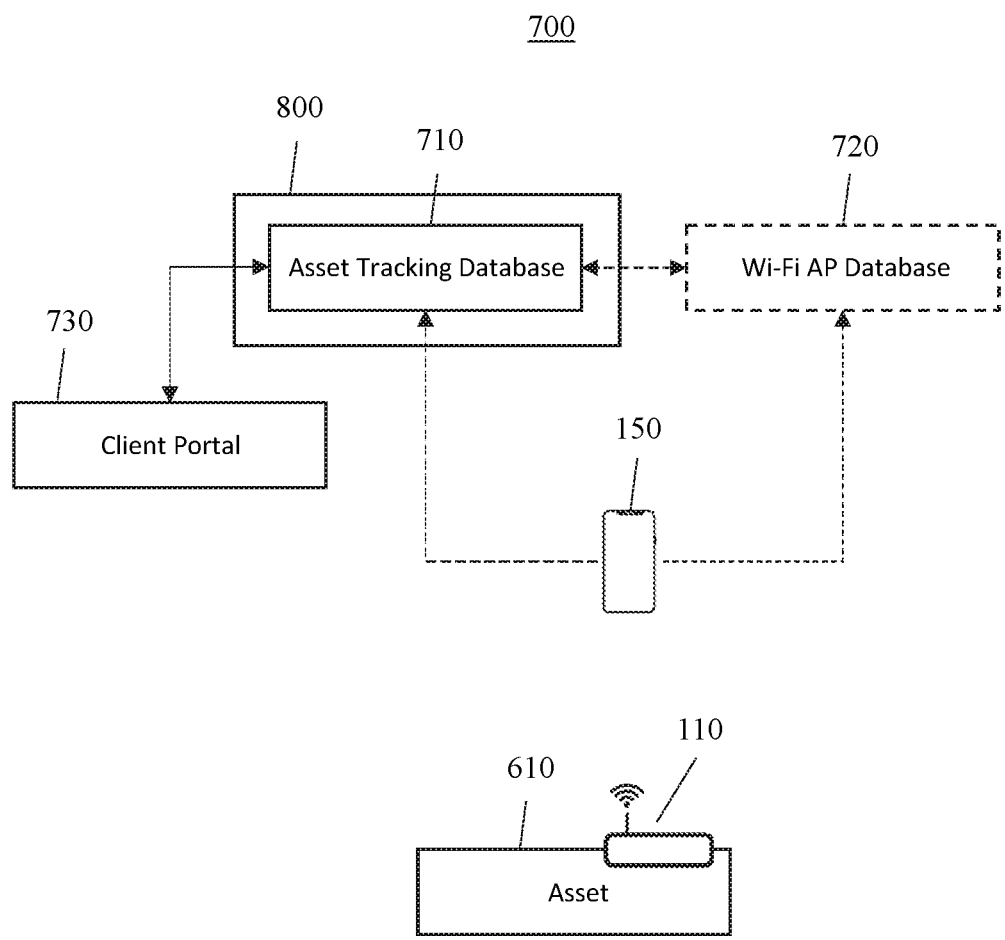
FIG. 7A shows a system for passive asset tracking with existing infrastructure in accordance with one or more embodiments of the present invention.

FIG. 7A shows a system 700 for passive asset tracking with existing infrastructure in accordance with one or more embodiments of the present invention. One or more Wi-Fi access points 110/1700 may be disposed, or otherwise attached to, or integrated with, one or more assets (e.g., 610) that are desired to be tracked. The unique identifying information of a Wi-Fi access point 110/1700 may be used to uniquely identify an asset (e.g., 610) that it is physically and logically associated with in an asset tracking database 710. The one or more assets (e.g., 610) may be deployed in the field and need not be co-located. The deployed Wi-Fi access points 110/1700 do not require Internet connectivity or other network connection or be configured to receive GPS signals, they simply must be powered on and either broadcast beacon frames or respond to probe request frames, with a probe response frame, as part of the Wi-Fi wireless network discovery process.

When one or more wireless devices (e.g., 150) come into range of one or more of the Wi-Fi access points 110/1700 disposed, or otherwise attached to, or integrated with, one or more assets (e.g., 610), the in-range Wi-Fi access points 110/1700 may either broadcast their beacon frame or respond to a probe request frame with a probe response frame including information that may be used to uniquely identify the corresponding assets (e.g., 610) and potentially other information that may be useful to the asset tracking task including custom use of certain information in the beacon frame or probe response frame. As noted above, the one or more wireless devices 150 typically report the time, the date, their current location, as well as the SSID and the BSSID of the in-range Wi-Fi access points 110/1700 encountered and discovered either directly to an asset tracking database 710 or to a Wi-Fi AP Database 720 (third-party or integrated) that may provide data to asset tracking database 710. Wi-Fi AP Database 720 may be a database managed by an original equipment manufacturer, an operating system developer, or a third-party software developer, or a database integrated with asset tracking database 710. In certain embodiments, Wi-Fi AP Database 720 may be part of iOS® or Android® location services used to improve location determination accuracy. Asset tracking database 710 may use the data provided directly by one or more wireless devices 150 or indirectly by way of, for example, Wi-Fi AP Database 720 to identify and locate one or more assets (e.g., 610), the data of which may be stored in asset tracking database 710. Depending on the type of data received, asset tracking database 710 may manipulate, extrapolate, or otherwise generate data stored therein. A client portal 730, which may be software executed on another computing system (not shown), executed on the same computer (not shown) as the asset tracking database 710, or an application (not shown) or web-based portal thereof executed on a wireless device (e.g., 150), may allow a user to interact with asset tracking database 710 and obtain relevant data contained therein.

In certain embodiments, system 700 for passive asset tracking with existing infrastructure may include asset tracking database 710 and may optionally include client portal 730. In other embodiments, system 700 may optionally include Wi-Fi AP Database 720, which is typically independent of system 700, as part of a closed wholistic embodiment of system 700. In such embodiments, Wi-Fi AP Database 720 may reside or execute on the same or a different computing system as that of asset tracking database 710 or be integrated with asset tracking database 710 or a software application thereof. In still other embodiments, system 700 may optionally include one or more Wi-Fi access points 110/1700 disposed on, otherwise attached to, or integrated with, one or more assets (e.g., 610). In still other embodiments, system 700 may optionally include one or more wireless devices 150, which are typically independent of system 700, that purposefully discover in-range Wi-Fi access points 110/1700, as part of a closed wholistic embodiment of system 700. In such embodiments, wireless device 150 may include dedicated software (not shown) that reports the time, the date, and the SSID and the BSSID of Wi-Fi access points 110/1700 it encounters to asset tracking database 710 or Wi-Fi AP Database 720, if integrated. While various embodiments of system 700 have been disclosed, one of ordinary skill in the art will recognize that a subset, superset, or combination of functions or features thereof, may be integrated, distributed, or excluded, in whole or in part, based on an application, design, or form factor in accordance with one or more embodiments of the present invention and the above-disclosure is not intended to limit the type, kind, or arrangement of system 700 that may be implemented, including those that include, integrate, separate, or exclude various aspects or features thereof.

Continuing, FIG. 7B shows exemplary data 740 reported by a wireless device 150 relating to encountered Wi-Fi access points 110/1700 in accordance with one or more embodiments of the present invention. Wireless device 150 may report, for example, identifying information of one or more in-range Wi-Fi access points 110/1700, their relative signal strength, as well as the time, the date, and the GPS location of the reporting wireless device 150, to asset tracking database 710 or Wi-Fi AP Database 720. The identifying information may include one or more of the SSID, the BSSID, or other information that may be used to uniquely identify the Wi-Fi access point 110/1700 including potentially other fields of the beacon frames, probe response frames, or other management frames that may be repurposed to convey information regarding the Wi-Fi access point 110/1700 or the asset it is associated with. For example, the BSSID of a Wi-Fi access point 110 may be a unique identifier of the asset it is physically (by way of location, attachment, or integration) and logically (by way of asset tracking database 710) associated with. In addition, the MAC address, SSID, or other field may be used to identify a Wi-Fi access point 110/1700 as an asset tracking type of Wi-Fi access point. In the future, such functionality could allow wireless devices 150 to take different action when an asset tracking type Wi-Fi access point is encountered, including potentially speeding up the identification, changes the nature of the reporting, or otherwise facilitating the asset tracking task. One of ordinary skill in the art will recognize that the type and kind of information reported by the wireless device 150 relating to a discovered Wi-Fi access point 110/1700 or an asset (e.g., 610) associated therewith may vary based on an application or design in accordance with one or more embodiments of the present invention, but must at least include information that uniquely identifies the Wi-Fi access point 110/1700.

Continuing, FIG. 7C shows exemplary data 720 stored or generated by asset tracking database 710 in accordance with one or more embodiments of the present invention. Asset tracking database 710 may associate unique identifying information, such as, for example, the BSSID, of a particular Wi-Fi access point 110/1700 with a particular asset (e.g., 610) on which it is disposed, attached to, or integrated with. As such, asset tracking database 710 may then use information relating to the discovery of one or more Wi-Fi access points 110/1700 that is reported by one or more wireless devices 150 to passively track one or more assets (e.g., 610) in an indirect manner, in many instances without an awareness by wireless devices 150, or users thereof, that they are participating in the asset tracking task.

Asset tracking database 710 may receive and store identifying information relating to a particular Wi-Fi access point 110/1700 that is logically associated within the database 710 with a particular asset (e.g., 610) and may include the time, date, and GPS location of the wireless device 150 that reported the particular Wi-Fi access point 110/1700. Asset tracking database 710 may also receive and store other information relating to the particular asset (e.g., 610) provided, directly or indirectly, by one or more wireless devices 150. Asset tracking database 710 may either receive, or determine through historical information or calculation, the last known location of the particular Wi-Fi access point 110/1700, and by relation, the particular asset (e.g., 610). Asset tracking database 710 may also receive identifying information, the signal strength, the time, date, and GPS location of one or more wireless devices 150 reporting other discovered Wi-Fi access points 110/1700. As such, asset tracking database 710 may use any information, including, potentially, times, dates, GPS locations, last known positions, and signal strengths to known Wi-Fi access points 110/1700 and well known trilateration or triangulation techniques to refine the accuracy of the location determination of the particular Wi-Fi access point 110/1700 and, by relation, the particular asset (e.g., 610). As such, asset tracking database 710 may develop a historical trend of location and potentially other information relating to the particular asset (e.g., 610) over a period of time.

Asset tracking database 710 may have a data structure that may include, but is not limited to, one or more of the time, date, GPS location, latitude ("GPS LAT"), longitude ("GPS LNG"), SSID, BSSID, and signal strength of an encountered Wi-Fi access point 110/1700 as part of each report, received directly or indirectly, from a wireless device 150 that encounters an in-range Wi-Fi access point 110/1700. The BSSID of the discovered Wi-Fi access point 110/1700 may be associated with, or used to reference, a particular asset (e.g., 610) being tracked.

Asset tracking database 710 may receive, calculate, or estimate a last known ("AP LK") position of the discovered Wi-Fi access point 110/1700. If a last know position of a Wi-Fi access point 110/1700 is not known, it may be estimated by the GPS location of the most recent wireless device 150 that reported discovery of the Wi-Fi access point 110/1700 or further refined with Wi-Fi triangulation or trilateration techniques. Asset tracking database 710 may, based on available information, calculate a current ("AP CUR") location for one or more Wi-Fi access points 110/1700, and by relation, the associated assets (e.g., 610) thereof. One of ordinary skill in the art will appreciate that calculating a location based on the last known location of one or more Wi-Fi access points, if any, the GPS locations of one or more wireless devices 150 reporting the Wi-Fi access points 110/1700, if available, and their relative signal strengths, and potentially other information relating thereto, may be used to determine or refine the location determination of one or more Wi-Fi access points 110/1700, and assets associated therewith, using well known Wi-Fi location refinement techniques. The calculated current location may be stored in asset tracking database 710 as the best estimate where a particular Wi-Fi access point 110/1700, and by relation, asset (e.g., 610) may be located.

One of ordinary skill in the art will recognize that asset tracking database 710 may receive, generate, or store other data relating to a Wi-Fi access point 110/1700, an asset (e.g., 610) associated therewith, or other metrics based on an application or design in accordance with one or more embodiments of the present invention.

Figure 7D:
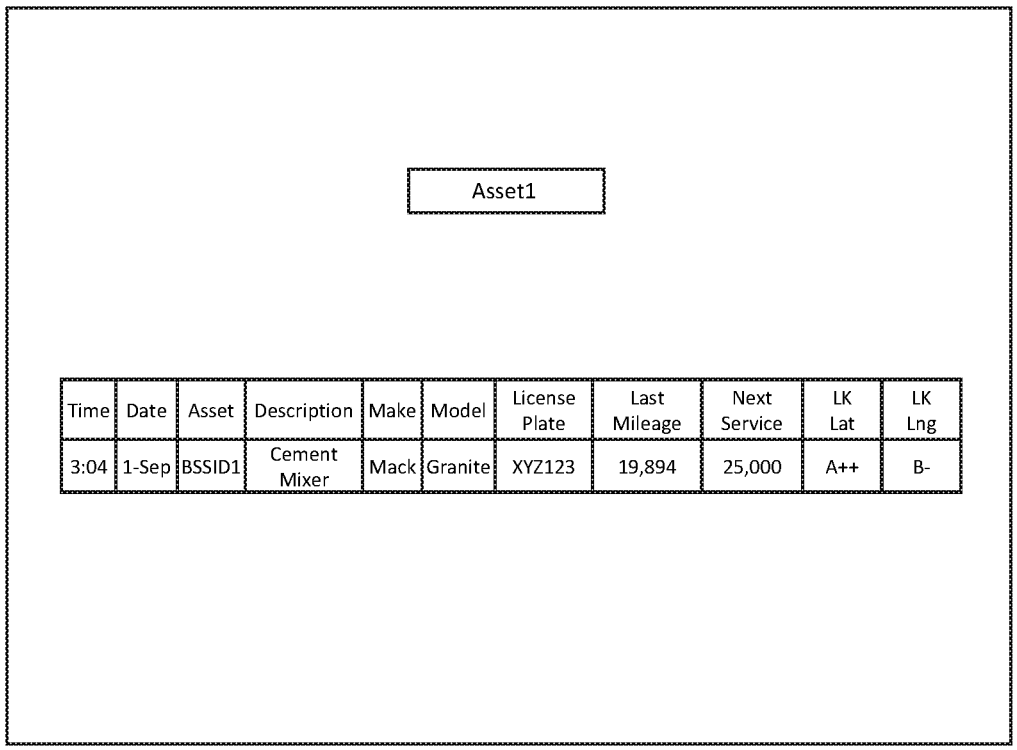
FIG. 7D shows an exemplary client portal to the asset tracking database in accordance with one or more embodiments of the present invention.

FIG. 7D shows an exemplary client portal 760 to asset tracking database 710 in accordance with one or more embodiments of the present invention. A user (not shown) may access the data contained within asset tracking database 710 via client portal 760 accessible via the same computer (not shown) on which the asset tracking database 710 is resident and executing, on another computer (not shown) with a network connection to asset tracking database 710, or via a software application potentially resident and executing on a wireless device (not shown), or web-based portal thereof, with a network connection to asset tracking database 710. One of ordinary skill in the art will recognize that client portal 760 may be disposed on any computer based on an application or design in accordance with one or more embodiments of the present invention. Client portal 760 may provide the user with the ability to access at least some of the data stored in asset tracking database 710. For example, a user may inquire as to the location of a specific asset. Client portal 760 may lodge the query with asset tracking database 710, receive the requested data, which in this case, may be the unique identifying information of the asset as well as its last known location. One of ordinary skill in the art will recognize that the interface, interaction with, and display of, data by client portal 760 may vary based on an application or design and may include graphical output (not shown), such as, for example, locations on a map where assets are located, in accordance with one or more embodiments of the present invention.

In one or more embodiments of the present invention, a method of passive asset tracking with existing independent infrastructure may include disposing a Wi-Fi access point on, in, or otherwise attaching to, or integrating with, a moveable physical asset to be tracked. The Wi-Fi access point may be a conventional off-the-shelf, industrial, battery-powered, or any other type or kind of Wi-Fi access point. However, because the Wi-Fi access point does not require routing features or true Wi-Fi functionality beyond that of participating in the Wi-Fi wireless network discovery protocol, custom Wi-Fi access points, such as, for example, dummy Wi-Fi access point 1700, that may eliminate features not implemented may be used to reduce the footprint and the power consumption of such a device. In addition, devices that spoof the Wi-Fi wireless network discovery protocol, such as, for example, dummy Wi-Fi access point 1700, may be used specifically for the asset tracking task. Notwithstanding, one of ordinary skill in the art will recognize that any Wi-Fi access point, or related device, capable of participating in Wi-Fi wireless network discovery protocol may be used in accordance with one or more embodiments of the present invention.

The method may further include logically associating unique identifying information of the Wi-Fi access point with the asset in an asset tracking database. The unique identifying information may be any information that uniquely identifies the Wi-Fi access point including, for example, the BSSID of the Wi-Fi access point. The asset tracking database may be any type or kind of database or software application that stores and potentially manipulates data. The Wi-Fi access point associated with a particular moveable asset may be stored in the same or a related record in the asset tracking database or otherwise related indicating their association, specifically, using the location of the Wi-Fi access point as a proxy for the location of the asset.

The method may further include receiving information relating to a location of the Wi-Fi access point encountered by one or more wireless devices and storing at least part of the information received in the asset tracking database. In certain embodiments, the information relating to the location of the Wi-Fi access point encountered is received directly or indirectly from a Wi-Fi AP Database or third-party provider. In other embodiments, the information relating to the location of the Wi-Fi access point encountered is received directly or indirectly from one or more of the reporting wireless devices. In certain embodiments, the one or more wireless devices, or users thereof, may not be aware that they are participating in the asset tracking task. The wireless devices simply report their location and the unique identifying information of Wi-Fi access points they encounter, typically as part of their participation in location services. In other embodiments, the one or more wireless devices may be used to intentionally participate in the asset tracking task. In all such embodiments, whenever a wireless device comes in-range of a Wi-Fi access point and receives unique identifying information about the Wi-Fi access point, the wireless device reports at least its location and the unique identifying information of the Wi-Fi access point, typically over a cellular connection, directly or indirectly to one or more of an original equipment manufacturer, an operating system developer, a location-based services provider, a Wi-Fi AP Database, or a third-party software application or database, or directly to the asset tracking database itself. The information relating to the location of the wireless device may include, for example, a time, date, GPS location of the reporting wireless device, last known location of the Wi-Fi access point, the unique identifying information of other in-range Wi-Fi access points, and their respective signal strengths. One of ordinary skill in the art will recognize that other information may be used and may vary based on an application or design in accordance with one or more embodiments of the present invention. As such, the information relating to the location of the Wi-Fi access point may be received by the asset tracking database directly or indirectly from one or more wireless devices that report their location as well as the unique identifying information of one or more Wi-Fi access points that they encounter.

The method may further include tracking the location of the Wi-Fi access point, and by relation, the asset itself, in the asset tracking database. The asset tracking database may maintain a record of reports relating to the Wi-Fi access point and receive or calculate an estimated location for the Wi-Fi access point, and by relation, the asset itself. This information may be stored in the asset tracking database as the estimated current location of the asset with any other information suitable for storing in the asset tracking database. As noted above, the asset tracking database may receive information that provides an estimate of a location of the Wi-Fi access point or information that may be used to estimate the location of the Wi-Fi access point using one or more of GPS determined locations, Wi-Fi access point locations and potentially associated signal strengths, trilateration, or triangulation. The method may further include providing a user access to information stored in the asset tracking database via a client portal. The client portal may include a software interface for querying and receiving information from the asset tracking database. The client portal may be part of the same computing system as that of the asset tracking database or a separate and distinct computing system or wireless device that connects to the asset tracking database over a network connection. In one or more embodiments of the present invention, a non-transitory computer readable medium comprising software instructions, when executed by a processor, may perform any of the above-noted methods.

In one or more embodiments of the present invention, a system for passive asset tracking with existing independent infrastructure may include a computing system having a central processing unit, a system memory, a network interface, and a storage device and a Wi-Fi access point disposed on, in, or otherwise attached to, a moveable asset to be tracked. An asset tracking database executing on the computing system may associate unique identifying information of the Wi-Fi access point with the asset. The asset tracking database may receive information relating to a location of the Wi-Fi access point identified by its unique identifying information transmitted as part of Wi-Fi wireless network discovery. The asset tracking database may track the location of the Wi-Fi access point and, by relation, the associated asset.

Figure 8:
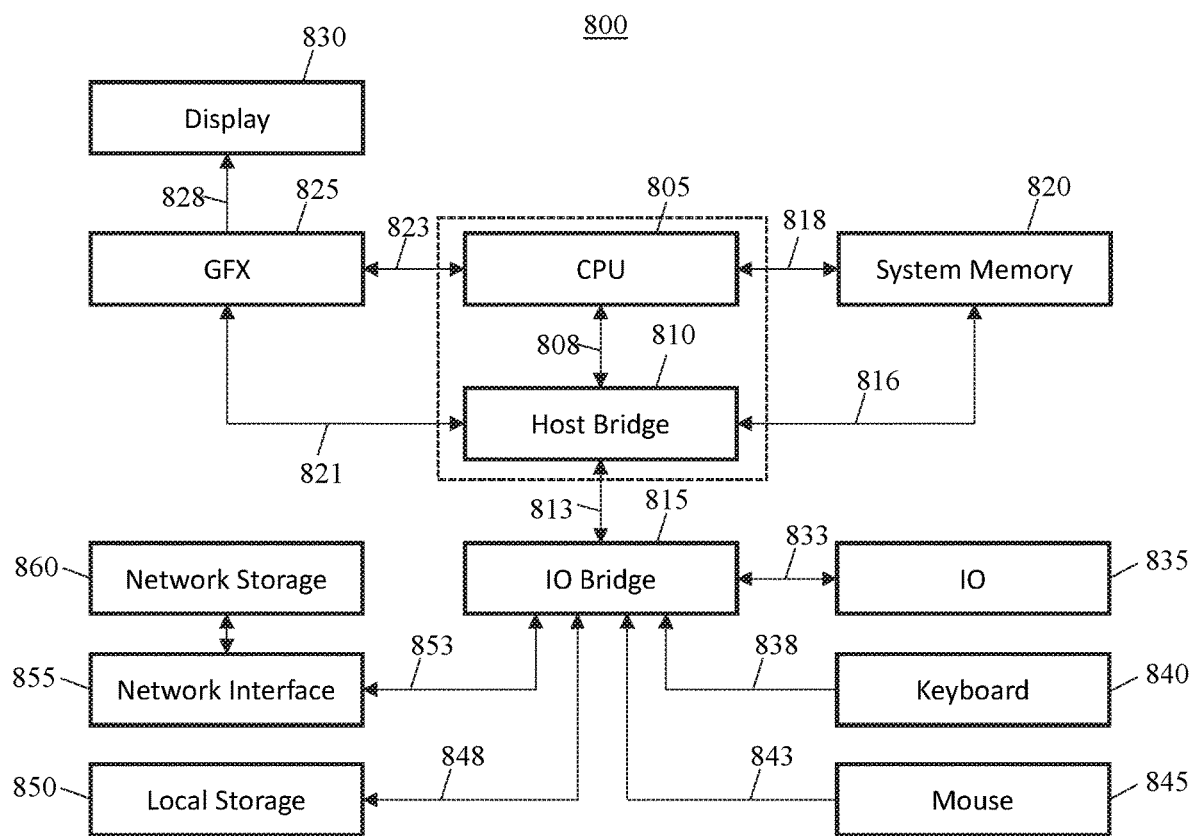
FIG. 8 shows a computing system in accordance with one or more embodiments of the present invention.

FIG. 8 shows a computing system 800 in accordance with one or more embodiments of the present invention. One or more of asset tracking database (e.g., 710 of FIG. 7), Wi-Fi AP Database (e.g., 720 of FIG. 7), or client portal (e.g., 760 of FIG. 7) may be software applications containing software instructions that, when executed by a processor of a computing system 800, perform one or more of the above-noted methods. One of ordinary skill in the art will recognize that a computing system 800 disclosed herein is merely exemplary of a computing system that may be used to execute any of the above-noted software and other computing systems well known in the art may be used in accordance with one or more embodiments of the present invention.

Computing system 800 may include one or more central processing units, sometimes referred to as processors (hereinafter referred to in the singular as "CPU" or plural as "CPUs") 805, host bridge 810, input/output ("IO") bridge 815, graphics processing units (singular "GPU" or plural "GPUs") 825, and/or application-specific integrated circuits (singular "ASIC or plural "ASICs") (not shown) disposed on one or more printed circuit boards (not shown) that perform computational operations. Each of the one or more CPUs 805, GPUs 825, or ASICs (not shown) may be a single-core (not independently illustrated) device or a multi-core (not independently illustrated) device. Multi-core devices typically include a plurality of cores (not shown) disposed on the same physical die (not shown) or a plurality of cores (not shown) disposed on multiple die (not shown) that are collectively disposed within the same mechanical package (not shown).

CPU 805 may be a general-purpose computational device that executes software instructions. CPU 805 may include an interface 808 to host bridge 810, an interface 818 to system memory 820, and an interface 823 to one or more IO devices, such as, for example, one or more GPUs 825. GPU 825 may serve as a specialized computational device that performs graphics functions related to frame buffer manipulation. However, one of ordinary skill in the art will recognize that GPU 825 may be used to perform non-graphics related functions that are computationally intensive. In certain embodiments, GPU 825 may interface 823 directly with CPU 805 (and interface 818 with system memory 820 through CPU 805). In other embodiments, GPU 825 may interface 821 with host bridge 810 (and interface 816 or 818 with system memory 820 through host bridge 810 or CPU 805 depending on the application or design). In still other embodiments, GPU 825 may interface 833 with TO bridge 815 (and interface 816 or 818 with system memory 820 through host bridge 810 or CPU 805 depending on the application or design). The functionality of GPU 825 may be integrated, in whole or in part, with CPU 805.

Host bridge 810 may be an interface device that interfaces between the one or more computational devices and TO bridge 815 and, in some embodiments, system memory 820. Host bridge 810 may include an interface 808 to CPU 805, an interface 813 to IO bridge 815, for embodiments where CPU 805 does not include an interface 818 to system memory 820, an interface 816 to system memory 820, and for embodiments where CPU 805 does not include an integrated GPU 825 or an interface 823 to GPU 825, an interface 821 to GPU 825. The functionality of host bridge 810 may be integrated, in whole or in part, with CPU 805. TO bridge 815 may be an interface device that interfaces between the one or more computational devices and various TO devices (e.g., 840, 845) and TO expansion, or add-on, devices (not independently illustrated). TO bridge 815 may include an interface 813 to host bridge 810, one or more interfaces 833 to one or more TO expansion devices 835, an interface 838 to keyboard 840, an interface 843 to mouse 845, an interface 848 to one or more local storage devices 850, and an interface 853 to one or more network interface devices 855. The functionality of TO bridge 815 may be integrated, in whole or in part, with CPU 805 and/or host bridge 810. Each local storage device 850, if any, may be a solid-state memory device, a solid-state memory device array, a hard disk drive, a hard disk drive array, or any other non-transitory computer readable medium. Network interface device 855 may provide one or more network interfaces including any network protocol suitable to facilitate networked communications.

Computing system 800 may include one or more network-attached storage devices 860 in addition to, or instead of, one or more local storage devices 850. Each network-attached storage device 860, if any, may be a solid-state memory device, a solid-state memory device array, a hard disk drive, a hard disk drive array, or any other non-transitory computer readable medium. Network-attached storage device 860 may or may not be collocated with computing system 800 and may be accessible to computing system 800 via one or more network interfaces provided by one or more network interface devices 855.

One of ordinary skill in the art will recognize that computing system 800 may be a conventional computing system or an application-specific computing system (not shown). In certain embodiments, an application-specific computing system (not shown) may include one or more ASICs (not shown) that perform one or more specialized functions in a more efficient manner. The one or more ASICs (not shown) may interface directly with CPU 805, host bridge 810, or GPU 825 or interface through IO bridge 815. Alternatively, in other embodiments, an application-specific computing system (not shown) may be reduced to only those components necessary to perform a desired function in an effort to reduce one or more of chip count, printed circuit board footprint, thermal design power, and power consumption. The one or more ASICs (not shown) may be used instead of one or more of CPU 805, host bridge 810, IO bridge 815, or GPU 825. In such systems, the one or more ASICs may incorporate sufficient functionality to perform certain network and computational functions in a minimal footprint with substantially fewer component devices.

As such, one of ordinary skill in the art will recognize that CPU 805, host bridge 810, IO bridge 815, GPU 825, or ASIC (not shown) or a subset, superset, or combination of functions or features thereof, may be integrated, distributed, or excluded, in whole or in part, based on an application, design, or form factor in accordance with one or more embodiments of the present invention. Thus, the description of computing system 800 is merely exemplary and not intended to limit the type, kind, or configuration of component devices that constitute a computing system 800 suitable for executing software methods in accordance with one or more embodiments of the present invention. Notwithstanding the above, one of ordinary skill in the art will recognize that computing system 800 may be a standalone, laptop, desktop, industrial, server, blade, or rack mountable system and may vary based on an application or design.

A sensor is a well-known type of device that senses an aspect of the physical environment in which it is located. Sensors typically detect or measure a physical property and record, transmit, or act in response to the sensed physical property.

Internet-connected sensors typically connect to a Wi-Fi client that identifies, authenticates to, and associates with, an in-range Wi-Fi access point that provides upstream network connectivity. In this way, the Internet-connected sensor may transmit sensor data to the Wi-Fi access point that is routed from the Wi-Fi access point to the bridged network connection, typically the Internet, for transmission to its final destination. In other applications, the sensor connects to a cellular modem that routes the sensor data to an upstream network connection. And in still other applications, the sensor connects directly to an upstream network connection.

In contrast to Internet-connected sensors, RFID tags store data and provide localized communications with an RFID reader that is in close proximity with the RFID tag. While the RFID reader may transmit RFID tag data upstream, the communication between the RFID reader and the RFID tag itself is localized. The RFID tag remains dormant until it receives an electromagnetic interrogation pulse from a nearby RFID reader. The electromagnetic interrogation pulse triggers the RFID tag to transmit the data stored in the RFID tag to the RFID reader. The RFID reader may transmit the data to its final destination via an upstream network connection. While some RFID applications incorporate a sensor, similar to Internet-connected sensors, RFID sensor tags require close proximity to an RFID reader in order to transmit the sensor data and the RFID reader must provide an upstream network connection in order to transmit the data to its final destination.

While Internet-connected sensors and RFID sensor tags have found widespread application, the trend towards ubiquitous Wi-Fi connectivity has given rise to a new paradigm, referred to as the Internet of Things ("IoT"). In a general sense, IoT involves the application of Internet connectivity to atypical devices that derive some benefit from the connectivity. In the sensor context, IoT sensors may be thought of as any type of sensor that is capable of sending or receiving sensor data via a network connection, such as the Internet. As such, IoT sensors integrate a Wi-Fi client, typically in the microcontroller, that is used to identify, authenticate to, and associate with an in-range Wi-Fi access point that routes the sensor data to its final destination via an upstream network connection. Because of the size and power constraints imposed on most IoT applications, communications are difficult unless the IoT sensor is placed in close proximity to the Wi-Fi access point or the signal strength is sufficiently strong to enable communications. However, IoT sensors, like Internet-connected sensors, RFID sensor tags, and all other Wi-Fi clients, must identify, authenticate to, and associate with, a Wi-Fi access point in order to transmit data to an upstream network connection for routing to its final destination. As such, the power constraints, complex setup, and ongoing administration frustrate the intent of IoT. Moreover, IoT sensors may only be deployed in locations within range of a suitable Wi-Fi access point that provides the upstream network connection. A common shortcoming of Internet-connected sensors, RFID tag sensors, and IoT sensors is that, they require a Wi-Fi client that identifies, authenticates to, and associates with, a Wi-Fi access point, that provides an upstream network connection, in order to transmit their sensor data.

Accordingly, in one or more embodiments of the present invention, a method of, and system for, passive sensor tracking with existing infrastructure uses a passive sensor that spoofs a beacon, probe response, or other management frame and places sensor data in a field that is reported by a Wi-Fi client, typically as part of location services, as part of reporting an encounter with a Wi-Fi access point. When a Wi-Fi client, such as a smartphone, encounters the Wi-Fi access point of the passive sensor, the beacon, probe response, or other management frame transmitted by the passive sensor includes sensor data in a field that is reported by the Wi-Fi client to a Wi-Fi AP Database or sensor tracking database that logs encountered Wi-Fi access points, typically as part of location services. Advantageously, a passive sensor may be deployed to sense a physical property in a location where no Wi-Fi access points or upstream network connectivity exists, relying instead on random Wi-Fi clients that happen to encounter the Wi-Fi access point of the passive sensor and merely report their encounter with the Wi-Fi access point to a third-party Wi-Fi AP Database or sensor tracking database, typically as part of location services. The report of the encounter may include, without awareness on the part of the user or Wi-Fi client, information relating to the Wi-Fi access point encountered, including, but not limited to, the BSSID and SSID. However, the Wi-Fi access point of the passive sensor transmits a beacon, probe response, or other management frame that places sensor data in a reported field such as, for example, the BSSID or SSID. In this way, a passive sensor may be deployed in an area with no network connectivity, relying instead on the existing infrastructure provided by the community of smartphones. Even if the smartphone has no cellular connection at the time of the encounter with the Wi-Fi access point, it may log the encounter and report it at a later time when it re-establishes connectivity. A sensor tracking database may obtain the sensor data directly or indirectly from the Wi-Fi AP Database and in some embodiments, from the wireless clients themselves, and make it available to a user that wishes to monitor the passive sensor. Accordingly, sensor data may be transmitted without authenticating to, or associating with, a Wi-Fi access point, and without requiring that the Wi-Fi access point provide access to an upstream network connection. In this way, passive sensors may be tracked using the existing infrastructure provided by the community of wireless devices that merely happen to encounter the passive sensors, without requiring an awareness on the part of the wireless device, or user thereof, that they are participating in the sensor tracking task.

Figure 9:
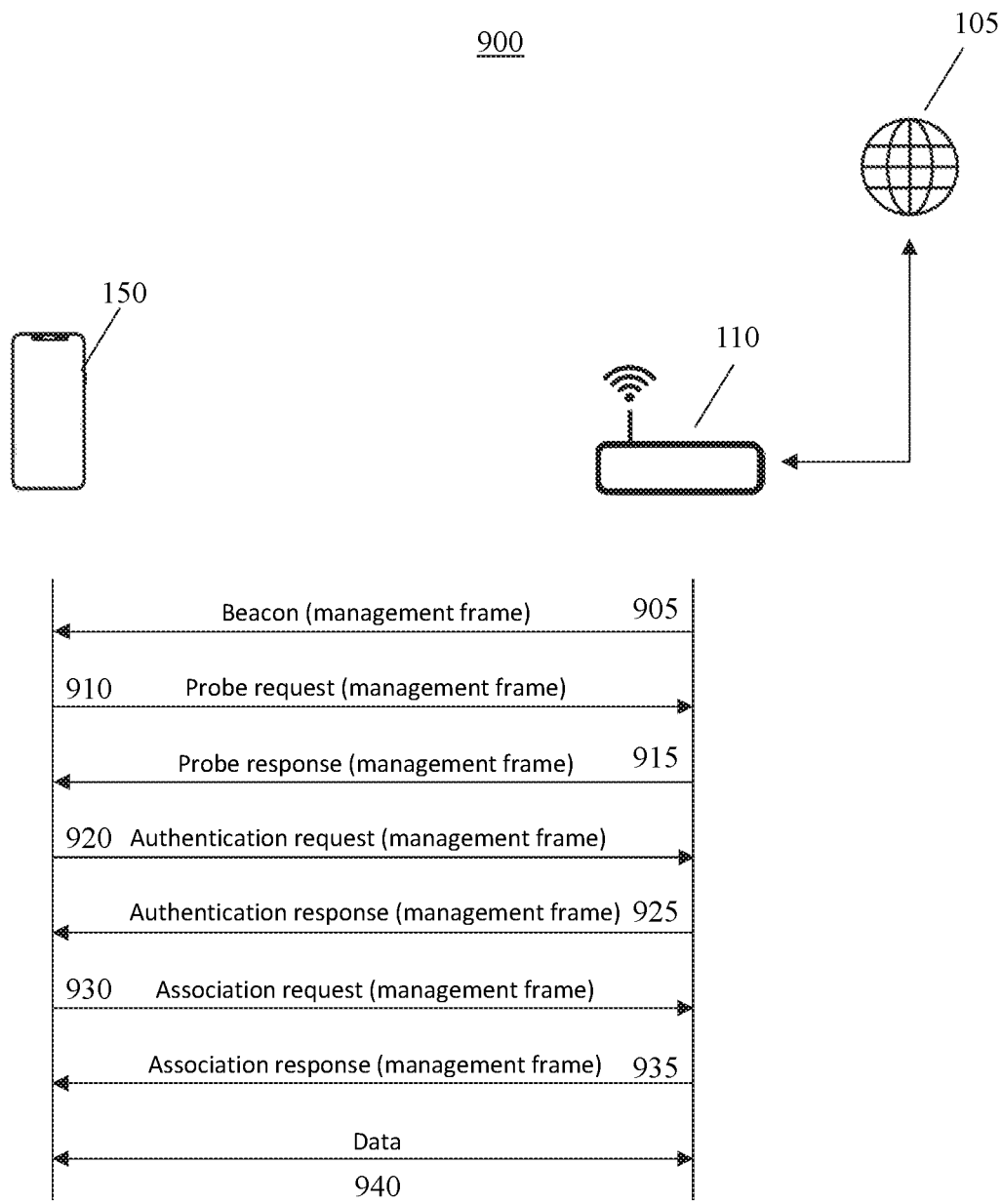
FIG. 9 shows a sequence of management frames exchanged between a conventional Wi-Fi client and a conventional Wi-Fi access point as part of Wi-Fi wireless network discovery resulting in data transfer.

FIG. 9 shows a sequence of management frames 900 exchanged between a conventional Wi-Fi client 150 and a conventional Wi-Fi access point 110 as part of Wi-Fi wireless network discovery. A conventional Internet-connected sensor (not shown), RFID reader of an RFID sensor tag (not shown), or IoT sensor (not shown) must integrate, or at least connect to, Wi-Fi client 150, and must successfully identify, authenticate to, and associate with, Wi-Fi access point 110 in order to transmit sensor data as part of data frames 940. As previously discussed, Wi-Fi wireless network discovery refers to the process by which a wireless device, such as a Wi-Fi client 150, identifies, authenticates to, and associates with, an in-range Wi-Fi access point 110 to enable data transfer with an upstream network connection 105.

The IEEE 802.11 standard specifies a protocol that includes three different types of frames: management frames, data frames, and control frames. Each type of frame serves a specific purpose with respect to the protocol. For example, management frames are used for supervisory functions including Wi-Fi wireless network discovery, data frames are used to transmit data once authenticated and associated, and control frames are used to facilitate the transmission of data. The IEEE 802.11 standard also specifies two different scenarios by which Wi-Fi clients 150 may identify, authenticate to, and associate with, Wi-Fi access points 110 as part of Wi-Fi wireless network discovery.

In passive scanning mode, a Wi-Fi client 150 listens for beacon frames 905, a type of management frame, that is broadcast at periodic intervals by a Wi-Fi access point 110. The beacon frame 905 announces the presence of the Wi-Fi access point 110 and includes information that facilitates potential authentication to, association with it, and ultimately data transmission, including, for example, the BSSID and SSID of the broadcasting Wi-Fi access point 110. For example, the user of a wireless device 150, such as, for example, a smartphone, may open the Wi-Fi application on their device, see a list of SSIDs corresponding to in-range Wi-Fi access points 110 that are broadcasting their respective beacon frames (e.g., 905), and select a particular SSID of a particular Wi-Fi access point 110 that the user wishes to join. When the user selects the SSID of a particular Wi-Fi access point 110, the Wi-Fi client 150 transmits a probe request frame 910, another type of management frame, to the particular Wi-Fi access point 110 that includes the capabilities of the Wi-Fi client 150. In the active scanning mode, without necessarily having received a beacon frame 950, the Wi-Fi client 150 transmits a probe request frame 910 that includes the capabilities of the Wi-Fi client 150 to a specific Wi-Fi access point 110 or all Wi-Fi access points 110 in range. As such, the Wi-Fi wireless network discovery process may be initiated by a Wi-Fi access point 110 that broadcasts beacon frames 905, or a Wi-Fi client 150 that transmits a probe request frame 910. Regardless of which, the remainder of the authentication and association protocol is substantially the same.

Subsequent to receipt of the probe request frame 910, if the Wi-Fi access point 110 has compatible parameters, the Wi-Fi access point 110 transmits a probe response frame 915, another type of management frame, to the Wi-Fi client 150. The probe response frame 915 includes the parameters typically included in the beacon frame 905 including capabilities of the Wi-Fi access point 110. It is important to note that, at this stage of the process, the Wi-Fi client 150 is unauthenticated to, and unassociated with, the Wi-Fi access point 110, and is not capable of transmitting data in data frames. Subsequent to receipt of the probe response frame 915, the Wi-Fi client 150 transmits an authentication request frame 920, another type of management frame, to the Wi-Fi access point 110. The authentication protocol establishes whether the Wi-Fi client 150 is authenticated to the Wi-Fi access point 110, i.e., ensuring compatibility with respect to encryption (open or shared key encryption). Without discussing the details of the authentication protocol, which is unnecessary for the purpose of describing the claimed invention, it is important to note that a Wi-Fi client 150 cannot proceed to association and data transfer until it is has been successfully authenticated to the Wi-Fi access point 110, as signified by an authentication response frame 925, another type of management frame, acknowledging successful authentication.

Once authenticated to Wi-Fi access point 110, Wi-Fi client 150 transmits an association request frame 930, another type of management frame, to Wi-Fi access point 110. The association request frame 930 signifies a request by the authenticated, but as yet unassociated Wi-Fi client 150 to associate with the Wi-Fi access point 110 and enable data transfer via data frames 940. The association request 930 includes information including, for example, capabilities of the Wi-Fi client 150. After receipt of the association request 930, the Wi-Fi access point 110 compares the capabilities set out in the association request 930 with the capabilities of the Wi-Fi access point 110 to determine if they match. If there is a mismatch, the Wi-Fi access point 110 makes a determination as to whether the difference is an issue that prevents association and data transfer. If there are no differences, or the differences do not prevent association, the Wi-Fi access point 110 transmits an association response 935, another type of management frame, acknowledging successful association. Once the association response 935 signifying successful association with Wi-Fi access point 110 is received, Wi-Fi client 150 may transmit data 940 to Wi-Fi access point 110 in data frames that are routed over a bridged network connection, typically the Internet 105, to its final destination. It is important to note that, in order for a Wi-Fi client 150 to transmit data, other than management frames, with Wi-Fi access point 110, the Wi-Fi client 150 must authenticate to, and associate with, Wi-Fi access point 110, thereby enabling Wi-Fi client 150 to transmit data 940. And similarly, Wi-Fi access point 110 cannot transfer data in data frames to Wi-Fi client 150 until Wi-Fi client 150 has authenticated to, and associated with, Wi-Fi access point 110.

Figure 10:
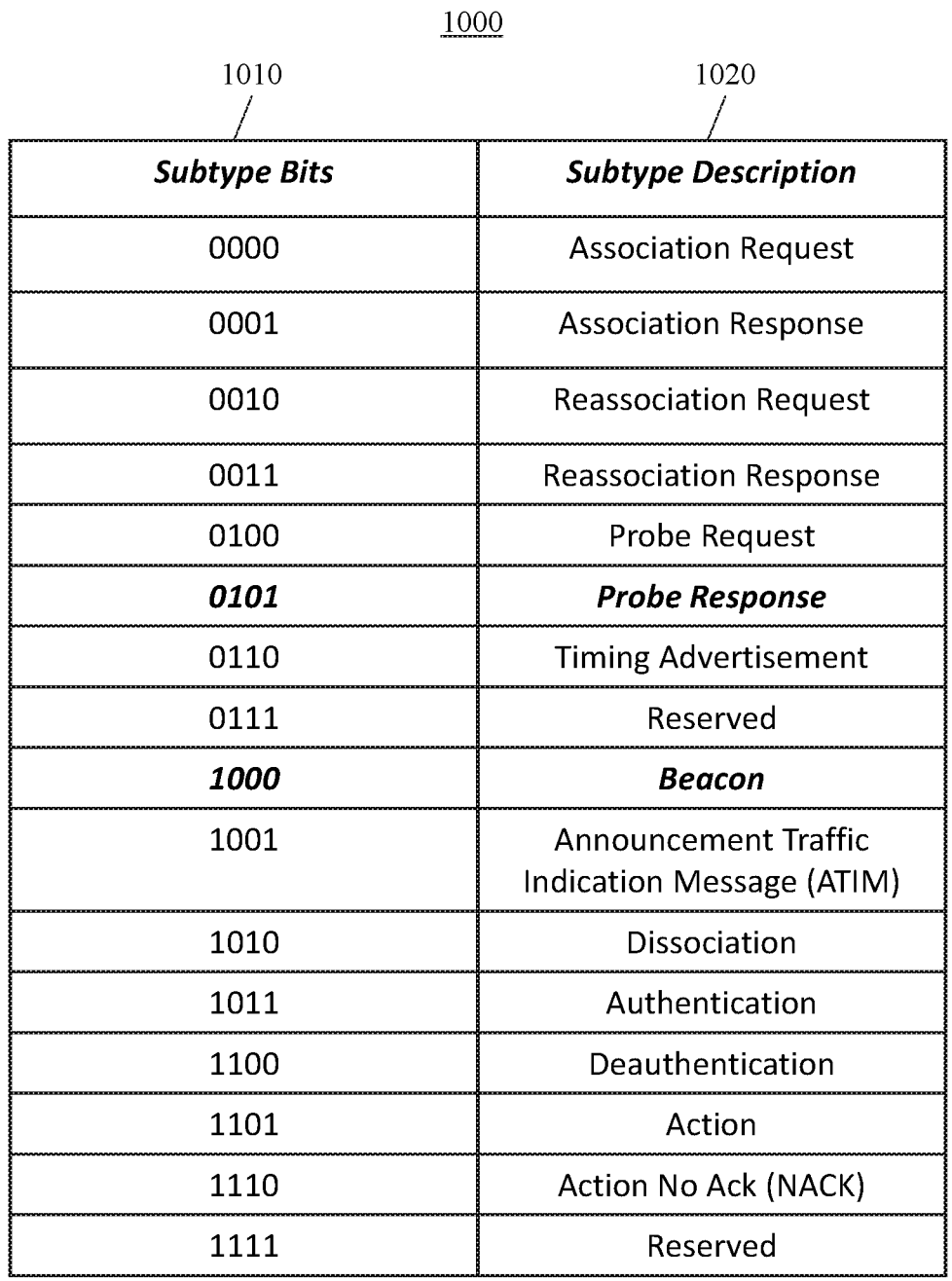
FIG. 10 shows the subtypes of management frames defined by the IEEE 802.11 standard.

FIG. 10 shows the subtypes of management frames 1000 defined by the IEEE 802.11 standard. In a conventional management frame (e.g., 1100 of FIG. 11), the first octet is defined as the Frame Control field (e.g., 1110 of FIG. 11). The first three subfields of the Frame Control field (e.g., 1110 of FIG. 11) are present in all IEEE 802.11 frames and include the protocol version (not shown), the type of frame, and the subtype of frame. The type of frame subfield indicates whether the frame is a management frame, data frame, or control frame. The subtype of frame subfield indicates the particular subtype of frame within the type. In the figure, the various subtypes of management frames are shown. The subtype bits 1010 represent the binary encoded subtype described by the subtype description 1020. For purposes of the discussion that follows, emphasis will be placed on the beacon frame and probe response frame subtypes of management frames. Notwithstanding, as can be seen by the enumerated list of management frames, other management frames used for supervisory purposes relating to identification, authentication, and association by conventional Wi-Fi clients (e.g., 150 of FIG. 9) may be used in accordance with one or more embodiments of the present invention.

Figure 11:
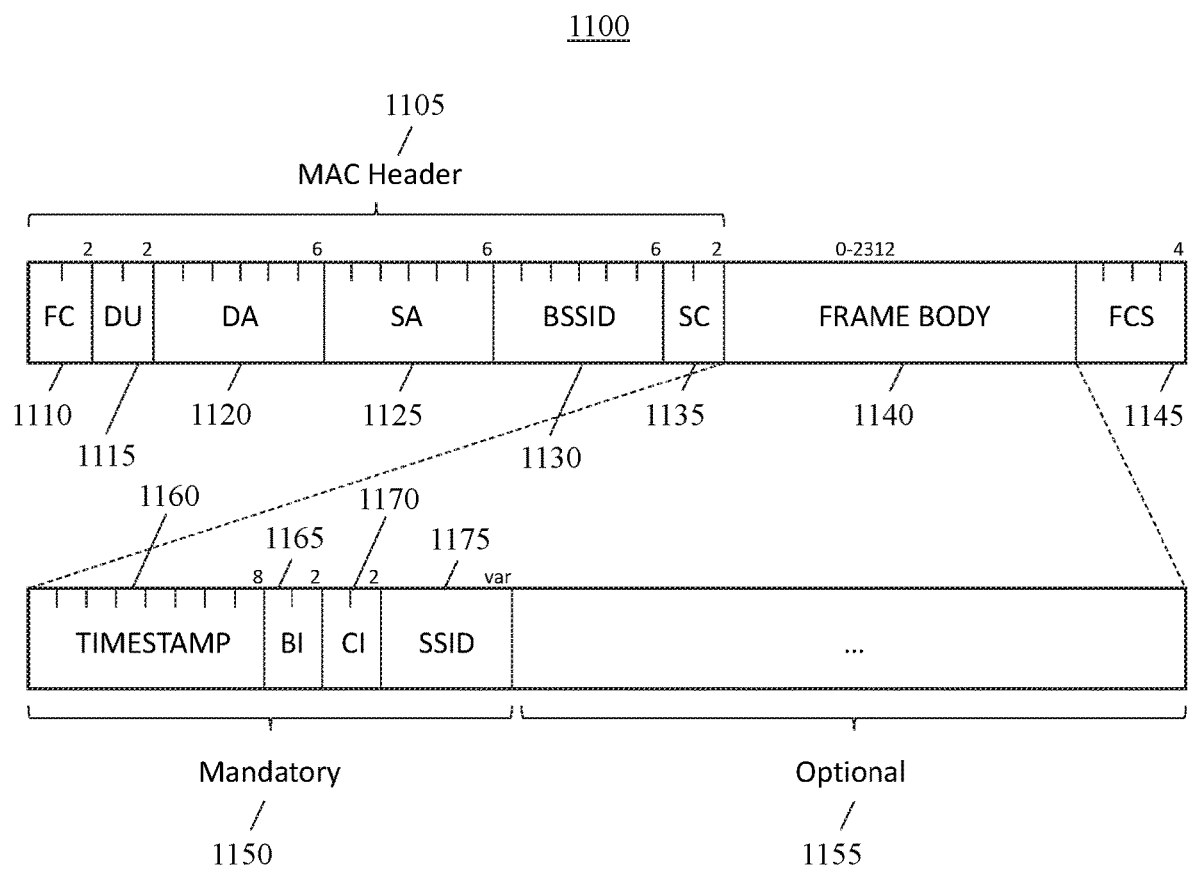
FIG. 11 shows the structure of a conventional management frame defined by the IEEE 802.11 standard.

FIG. 11 shows the structure of a conventional management frame 1100 defined by the IEEE 802.11 standard representative of the type of management frames transferred between a conventional Wi-Fi client (e.g., 150 of FIG. 9) and a conventional Wi-Fi access point (e.g., 110 of FIG. 9). The conventional management frame 1100 includes a number of predetermined fields that are defined by the specification for their protocol-defined purpose. For example, MAC header 1105 of management frame 1100, includes Frame Control field 1110, Duration field 1115, Destination Address field 1120, Source Address field 1125, BSSID 1130, and Sequence Control field 1135. Management frame 1100 further includes the Frame Body field 1140 that includes a number of subfields, including some that may vary based on the subtype (e.g., 1010 of FIG. 10) of management frame 1140. For example, Frame Body 1140 includes mandatory subfields 1150 including Timestamp subfield 1160, Beacon Interval subfield 1165, Compatibility Information subfield 1170, SSID subfield 1175, and potentially Supported Rates subfield (not shown). Frame Body field 1140 may also include one or more optional subfields 1155 that also may vary based on the subtype (e.g., 1010 of FIG. 10) of management frame 1140. The end of management frame 1100 includes a Frame Check Sequence field 1145 that includes an error-detecting code. During conventional Wi-Fi wireless network discovery, beacon frames, probe response frames, and other management frames are in the form of conventional management frame 1100, for the purpose of furthering identification, authentication to, and association with, a Wi-Fi access point (e.g., 110 of FIG. 9).

Figure 12:
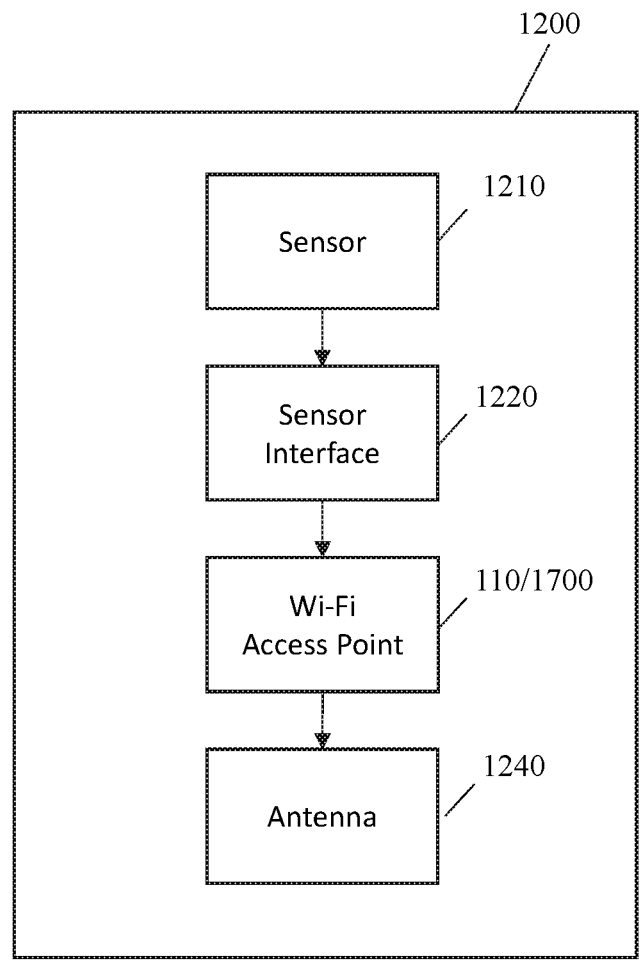
FIG. 12 shows a passive sensor in accordance with one or more embodiments of the present invention.

FIG. 12 shows a block diagram of a passive sensor 1200 in accordance with one or more embodiments of the present invention. In one or more embodiments of the present invention, passive sensor 1200 may include a sensor portion 1210, a sensor interface 1220, a Wi-Fi access point 110/1700, and an antenna 1240. In certain embodiments, passive sensor 1200 may include a conventional Wi-Fi access point 110 configured to spoof beacon frames, probe response frames, or other management frames that comprise sensor data. In other embodiments, passive sensor 1200 may include a dummy Wi-Fi access point 1700. Sensor portion 1210 may be any type or kind of device that senses a physical property and outputs a sensor signal comprising sensor data corresponding to the physical property sensed. For example, sensor portion 1210 may sense a temperature and output an electrical signal corresponding to the temperature. While specific examples of various types and kinds of sensors are disclosed herein, one of ordinary skill in the art will recognize that the present invention is not limited and may be used with any type or kind of sensor portion 1210, which may vary based on an application or design in accordance with one or more embodiments of the present invention. Notwithstanding the above, sensor portion 1210 may include, for example, without limitation, an acoustic sensor, ultrasonic sensor, infrared sensor, light sensor, color sensor, electric sensor, continuity sensor, resistance sensor, inductance sensor, capacitance sensor, electric field sensor, magnetic sensor, temperature sensor, thermal sensor, mechanical sensor, pressure sensor, humidity sensor, proximity sensor, contact sensor, tilt sensor, chemical sensor, moisture sensor, smoke sensor, gas sensor, alcohol sensor, seismic sensor, distance sensor, or touch sensor. Passive sensor 1200 may also include a sensor interface 1220 that inputs the sensor signal and generates sensor data corresponding to the physical property sensed, that may be placed or encoded in a field of a spoofed beacon frame, probe response frame, or other management frame that may be reported by a wireless device that encounters the Wi-Fi access point 110/1700, typically as part of location services or a direct or indirect report to a sensor tracking database.

In certain embodiments, passive sensor 1200 may include an integrated Wi-Fi access point 110. While fully capable chipsets may be used to implement Wi-Fi access point 110, for the purposes of the claimed invention, Wi-Fi access point 110 may not allow any Wi-Fi client (e.g., 150 of FIG. 9) to authenticate to, or associate with, Wi-Fi access point 110. Further, Wi-Fi access point 110 may not provide upstream network connectivity. Instead, Wi-Fi access point 110 is only required to participate, potentially in a limited manner, in the Wi-Fi wireless network discovery process by transmitting spoofed beacon frames, probe response frames, or other management frames that comprise sensor data disposed or otherwise encoded therein. As such, in certain embodiments, Wi-Fi access point 110 may merely participate in a subset of the Wi-Fi wireless network discovery process, to clandestinely transmit sensor data that is disposed or otherwise encoded, unbeknownst by the recipient Wi-Fi client (e.g., 150 of FIG. 9), in the spoofed beacon frame, probe response frame, or other management frame.

In other embodiments, passive sensor 1200 may include a dummy Wi-Fi access point 1700. For the purpose of this disclosure, a "dummy" Wi-Fi access point 1700 is an device that imitates, or spoofs, a functional Wi-Fi access point by participating in the Wi-Fi wireless network discovery process by transmitting spoofed beacon frames, probe response frames, or other management frames that comprise sensor data disposed or otherwise encoded therein. However, a Wi-Fi client (e.g., 150 of FIG. 9) may not be allowed to authenticate to, or associate with, dummy Wi-Fi access point 1700 and dummy Wi-Fi access point 1700 may not provide an upstream network connection. As such, in certain embodiments, dummy Wi-Fi access point 1700 may merely participate, in a limited manner, in the Wi-Fi wireless network discovery process, to clandestinely transmit sensor data that is disposed or otherwise encoded, unbeknownst by the recipient Wi-Fi client (e.g., 150 of FIG. 9), in the spoofed beacon frame, probe response frame, or other management frames.

When the Wi-Fi client (e.g., 150 of FIG. 9) reports the encounter with the Wi-Fi access point 110 (or dummy Wi-Fi access point 1700), the Wi-Fi client (e.g., 150 of FIG. 9) reports certain information about the encounter to a third-party Wi-Fi AP Database, typically for the purpose of enhancing location services, and in certain embodiments the report may be made directly or indirectly to a sensor tracking database. As previously discussed, Wi-Fi clients (e.g., 150 of FIG. 9) report certain information about Wi-Fi access points that they encounter to a database, such as, for example, a Wi-Fi AP Database (not shown) that tracks this information, typically to enhance location services, or a dedicated sensor tracking database. Here, the sensor data may be clandestinely placed or encoded in the spoofed beacon frame, probe response frame, or other management frame, ensuring that the sensor data is stored in a field that is reported as part of the report of the encounter with the Wi-Fi access point 110/1700, typically for the purpose of enhancing location services.

Passive sensor 1200 may also include an antenna 1240 for purposes of transmitting spoofed beacon frame, probe response frame, or other management frames. While key aspects of a passive sensor 1200 are shown, one of ordinary skill in the art will recognize that various aspects of a sensor that are well known are not descried to avoid obscuring the invention, including, for example, the type or kind of sensor, power input, and firmware. Moreover, one of ordinary skill in the art will recognize that the various portions of passive sensor 1200, or the functions or features they represent, may be integrated or distributed based on an application or design in accordance with one or more embodiments of the present invention.

Figure 13:
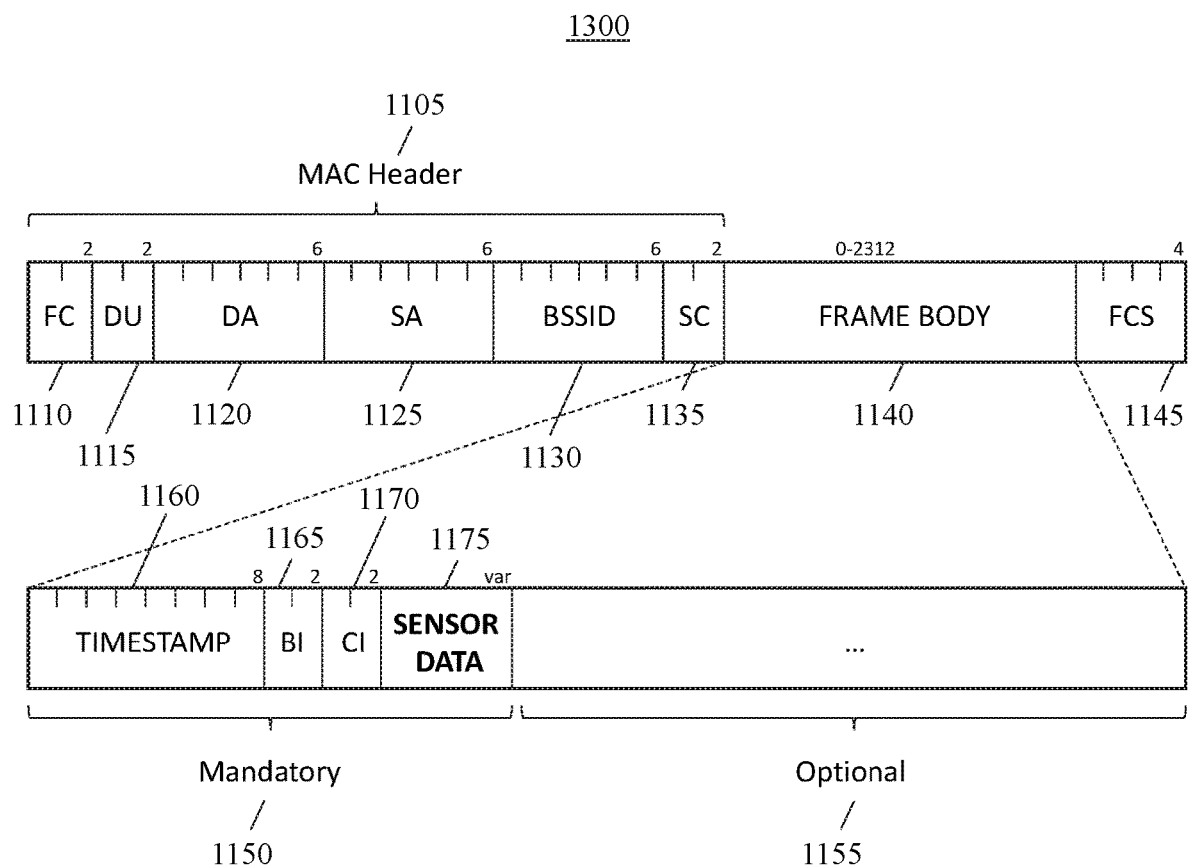
FIG. 13 shows a spoofed management frame transmitted by a Wi-Fi access point of the passive sensor in accordance with one or more embodiments of the present invention.

FIG. 13 shows a spoofed management frame 1300 transmitted by a Wi-Fi access point (e.g., 110 of FIG. 5) or dummy Wi-Fi access point (e.g., 1700 of FIG. 16) of the passive sensor (e.g., 1200 of FIG. 12) in accordance with one or more embodiments of the present invention. Instead of using conventional management frames (e.g., 1100 of FIG. 11) for their intended use, in one or more embodiments of the present invention, sensor data may be placed or encoded, without awareness, in a spoofed beacon frame (e.g., 1405 of FIG. 14), probe response frame (e.g., 1415 of FIG. 14), or other management frame transmitted by the Wi-Fi access point (e.g., 110 of FIG. 5) or dummy Wi-Fi access point (e.g., 1700 of FIG. 16) of the passive sensor 1200. In this way, a Wi-Fi client (e.g., 150 of FIG. 9) that happens to encounter the Wi-Fi access point (e.g., 110 of FIG. 5) or the dummy Wi-Fi access point (e.g., 1700 of FIG. 16) of passive sensor 1200, will receive either the spoofed beacon frame (e.g., 1405 of FIG. 14), probe response frame (e.g., 1415 of FIG. 14), or other management frame (not shown) from the Wi-Fi access point (e.g., 110 of FIG. 5) or dummy Wi-Fi access point (e.g., 1700 of FIG. 12) of passive sensor 1200 that includes sensor data placed or encoded in the frame. Then, when the Wi-Fi client (e.g., 150 of FIG. 9) reports the encounter with the Wi-Fi access point (e.g., 110 of FIG. 5) or the dummy Wi-Fi access point (e.g., 1700 of FIG. 16) of passive sensor 1200, the Wi-Fi client (e.g., 150 of FIG. 9) reports, potentially without awareness, the sensor data to a Wi-Fi AP Database that typically tracks Wi-Fi access points to enhance location services or, directly or indirectly, to the sensor tracking database.

In one or more embodiments of the present invention, information including, but not limited to, unique identifying information of the passive sensor (e.g., 1200 of FIG. 12) and sensor data may be disposed or encoded in one or more fields of a spoofed beacon frame (e.g., 1405 of FIG. 14), probe response frame (e.g., 1415 of FIG. 14), or other management frame. While any field of the spoofed management frame 1300 may be used, the one or more fields selected to place or encode sensor data may be selected such that they are fields that are reported by a Wi-Fi client (e.g., 150 of FIG. 9) as part of a report of encounters with Wi-Fi access points, typically as part of the standard reporting feature used by location services. In the example depicted in the figure, BSSID field 1130 may be used to uniquely identify the Wi-Fi access point (e.g., 110 of FIG. 5) or the dummy Wi-Fi access point (e.g., 1700 of FIG. 16) of the passive sensor 1200 and by association the passive sensor 1200 itself. The sensor data, corresponding to a static or dynamic value, may be disposed or otherwise encoded in an appropriate field, either numeric or alphanumeric, with or without encoding. In the example depicted in the figure, SSID field 1175 may be used to encode sensor data 1175. When a Wi-Fi client (e.g., 150 of FIG. 9) encounters a Wi-Fi access point (e.g., 110/1700 of FIG. 12), the Wi-Fi client (e.g., 150 of FIG. 9) reports, at least, BSSID 1130 and SSID 1175 of the Wi-Fi access point it encountered. Because the spoofed beacon frame (e.g., 1405 of FIG. 14), probe response frame (e.g., 1415 of FIG. 14) or other management frame transmitted by the Wi-Fi access point (e.g., 110 of FIG. 5) or dummy Wi-Fi access point (e.g., 1700 of FIG. 16) of passive sensor 1200 includes sensor data 1175, the Wi-Fi client (e.g., 150 of FIG. 9) will report the unique identifying information 1130 of the passive sensor (e.g., 1200 of FIG. 12) and the sensor data 1175, potentially without awareness, to the Wi-Fi AP Database, which may be made available to a sensor tracking database (not shown) and clients thereof or directly or indirectly to the sensor tracking database itself.

Figure 14:
FIG. 14 shows a sequence of management frames exchanged between a conventional Wi-Fi client and a Wi-Fi access point of a passive sensor as part of Wi-Fi wireless network discovery in accordance with one or more embodiments of the present invention.
Figure 14:
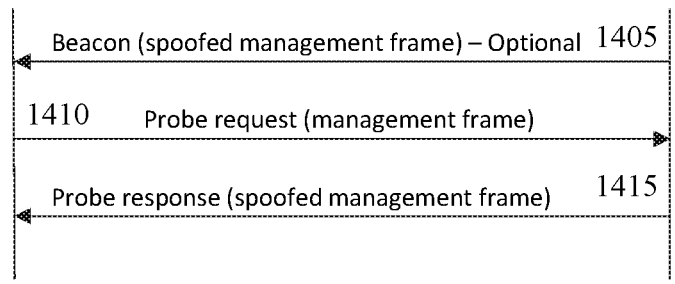

FIG. 14 shows a sequence of management frames exchanged between a conventional Wi-Fi client 150 and a Wi-Fi access point (e.g., 110 of FIG. 5) or dummy Wi-Fi access point (e.g., 1700 of FIG. 16) of a passive sensor 1200 as part of Wi-Fi wireless network discovery in accordance with one or more embodiments of the present invention. As noted above, the Wi-Fi access point (e.g., 110 of FIG. 5) or dummy Wi-Fi access point (e.g., 1700 of FIG. 16) of passive sensor 1200 may only participate, in a limited manner, in Wi-Fi wireless network discovery. The Wi-Fi access point (e.g., 110 of FIG. 5) or the dummy Wi-Fi access point (e.g., 1700 of FIG. 16) may transmit a spoofed beacon frame 1405, probe response frame 1415, or other management frame that comprises sensor data (e.g., 1175 of FIG. 13), but appear to be bona fide management frames (e.g., 1100 of FIG. 11) to the Wi-Fi client 150. However, the Wi-Fi access point (e.g., 110/1700 of FIG. 12) of passive sensor 1200 is not required to allow the Wi-Fi client 150 to authenticate to, or associate with, the Wi-Fi access point (e.g., 110/1700 of FIG. 12) and the Wi-Fi access point (e.g., 110/1700 of FIG. 12) is not required to provide upstream network connectivity. In certain embodiments, the dummy Wi-Fi access point (e.g., 1700 of FIG. 16) does not allow the Wi-Fi client 150 to authenticate to, or associate with, the dummy Wi-Fi access point (e.g., 1700 of FIG. 16) and does not provides upstream network connectivity. The Wi-Fi client 150 cannot proceed to authentication or association and will not receive anything from the dummy Wi-Fi access point (e.g., 1700 of FIG. 16) other than spoofed beacon frames 1405, probe response frames 1415, or other management frames (e.g., 1300 of FIG. 13) that comprises sensor data (e.g., 1175 of FIG. 13).

Figure 15A:
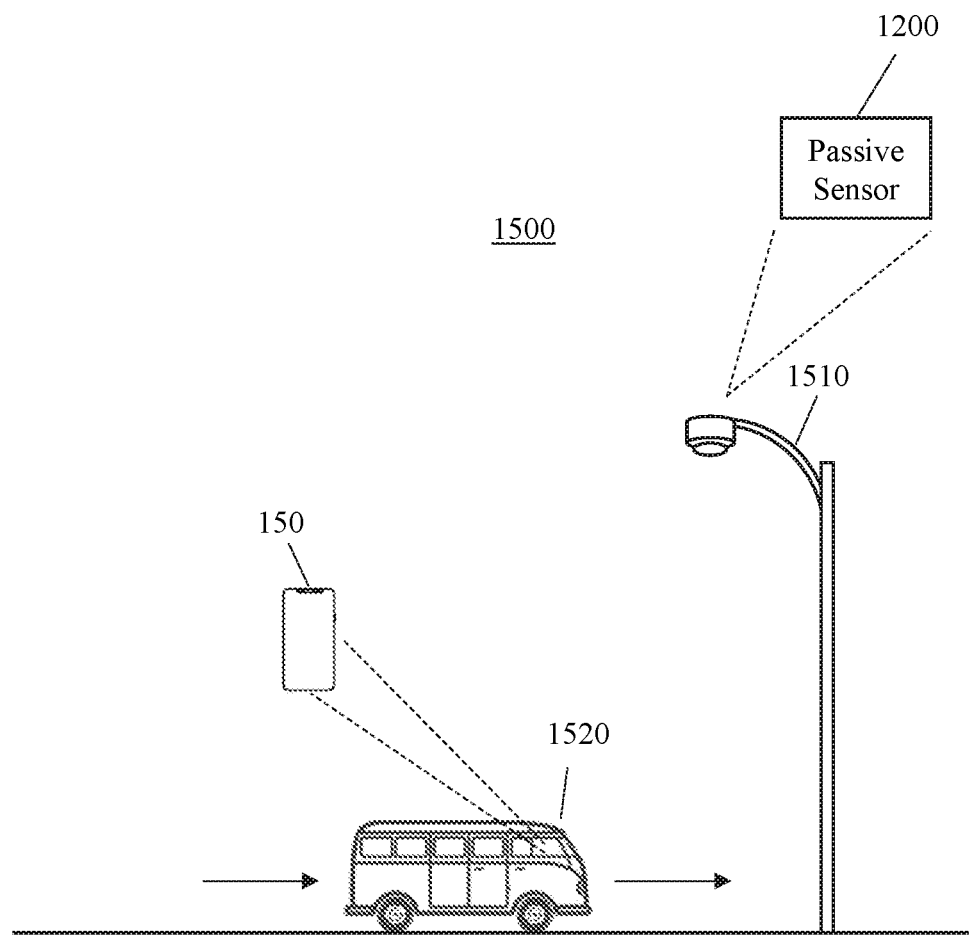
FIG. 15A shows an exemplary application of an unaware, unauthenticated, and unassociated Wi-Fi client receiving a spoofed management frame from a Wi-Fi access point of a passive sensor in accordance with one or more embodiments of the present invention.

FIG. 15A shows an exemplary application 1500 of an unaware, unauthenticated, and unassociated Wi-Fi client 150 receiving a spoofed management frame (e.g., 1300 of FIG. 13) from a Wi-Fi access point (e.g., 110 of FIG. 5) or dummy Wi-Fi access point (e.g., 1700 of FIG. 16) of a passive sensor 1200 in accordance with one or more embodiments of the present invention. For the purposes of illustration, consider the example of a streetlight fixture 1510 with passive sensor 1200 that senses the state of the light bulb disposed therein. For example, passive sensor 1200 may be a continuity sensor where the electrical continuity, or lack thereof, indicates whether the light bulb is functional or burned out. When a passenger vehicle 1520 drives by the streetlight 1510, the driver's smartphone, W-Fi client 150, may receive a spoofed beacon frame, probe response frame, or other management frame (e.g., 1300 of FIG. 13) from the Wi-Fi access point (e.g., 110 of FIG. 5) or the dummy Wi-Fi access point (e.g., 1700 of FIG. 16) of passive sensor 1200. In certain embodiments, Wi-Fi client 150 is not required to authenticate to, or associate with, the Wi-Fi access point (e.g., 110/1700 of FIG. 12) of passive sensor 1200 and the Wi-Fi access point (e.g., 110/1700 of FIG. 12) is not required to provide upstream network connectivity. In other embodiments, Wi-Fi client 150 cannot authenticate to, or associate with, the dummy Wi-Fi access point (e.g., 1700 of FIG. 16) of passive sensor 1200 and the dummy Wi-Fi access point (e.g., 1700 of FIG. 16) does not provide any upstream network connectivity. It is important to note that Wi-Fi client 150 has received, without awareness, sensor data in the spoofed beacon frame (e.g., 1405 of FIG. 14), probe response frame (e.g., 1415 of FIG. 14), or other management frame (e.g., 1300 of FIG. 13).

Figure 15B:
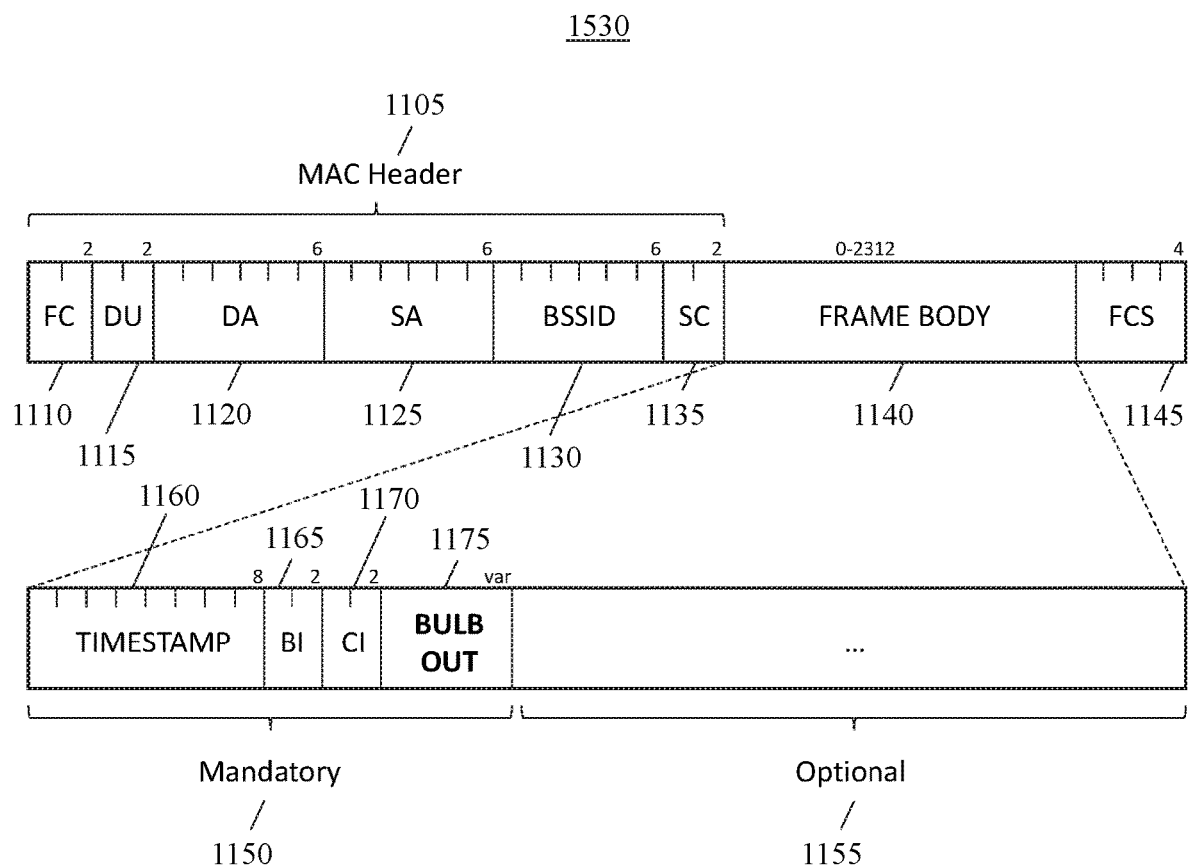
FIG. 15B shows an exemplary spoofed management frame provided by the Wi-Fi access point of the passive sensor in accordance with one or more embodiments of the present invention.

Continuing, FIG. 15B shows an exemplary spoofed management frame 1530 provided by the Wi-Fi access point (e.g., 110 of FIG. 5) or the dummy Wi-Fi access point (e.g., 1700 of FIG. 16) of passive sensor 1200 in accordance with one or more embodiments of the present invention. As shown, SSID subfield 1175 may contain sensor data, in this instance, an indicator of whether the light bulb is functional or burned out. In the example, continuity may indicate the light bulb is functional and a lack of continuity may indicate the light bulb is burned out. Here, for purposes of illustration, we will assume that the sensor data indicates that the light bulb is burned out. The sensor data may be numeric or alphanumeric, explicit or encoded, and customized based on the type or kind of sensor and the type of sensed data it provides. Here, since the SSID is a textual field 1175, an alphanumeric representation of the sensor output, "BULB OUT", may be placed in SSID subfield 1175. One of ordinary skill in the art will recognize that passive sensor may include hardware and software, such as firmware that allows for the customizable presentation of sensor data based on a sensed physical property. In the example, the firmware may place the appropriate alphanumeric data corresponding to the binary continuity state of the light bulb in SSID subfield 1175. One of ordinary skill in the art will recognize that other fields may be used in accordance with one or more embodiments of the present invention.

Figure 15C:
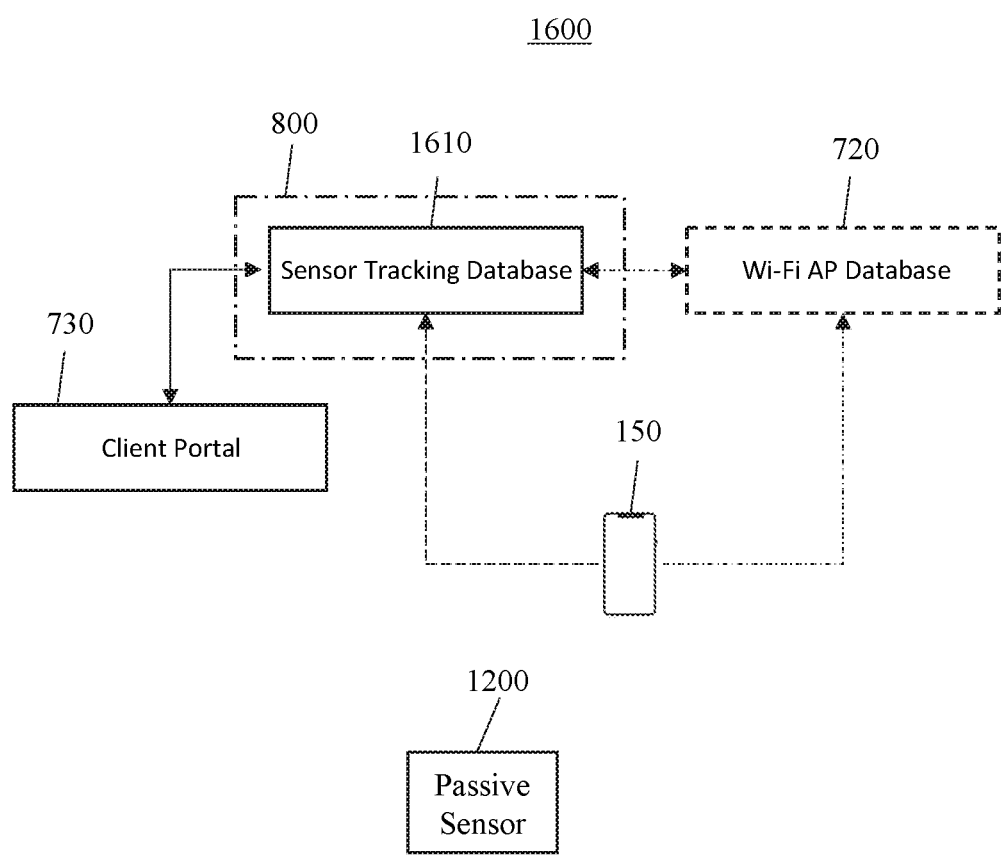
FIG. 15C shows a system for passive sensor tracking with existing infrastructure in accordance with one or more embodiments of the present invention.

Continuing, FIG. 15C shows a system 1600 for passive sensor tracking with existing infrastructure in accordance with one or more embodiments of the present invention. After the driver's smartphone, Wi-Fi client 150, receives the sensor data as part of the spoofed beacon frame (e.g., 1405 of FIG. 14), probe response frame (e.g., 1415 of FIG. 14), or other management frame, the Wi-Fi client 150 may report the encounter with the Wi-Fi access point, typically as part of location services but Wi-Fi client 150 may transmit information relating to the encounter with Wi-Fi AP Database 720 or directly or indirectly to sensor tracking database 1610. While the information reported by Wi-Fi client 150 typically relates to unique identifying information of the Wi-Fi access point encountered, it includes certain information including, for example, the BSSID and the SSID of the Wi-Fi access point (e.g., 110) or the dummy Wi-Fi Access Point (e.g., 1700 of FIG. 16) of passive sensor 1200. While the BSSID and SSID are used in this example, one of ordinary skill in the art will recognize that any fields or subfields, or combinations or portions thereof, may be used to convey sensor data. When a client (not shown) wishes to determine the state of a given passive sensor 1200, the client (not shown) may access sensor tracking database 1610 through a standalone client application (not shown) or web-based portal 730 thereof. Using the unique identifying information of passive sensor 1200, the client (not shown) may find reports corresponding to the sensor 1200 of interest. Then the client (not shown) may find the sensor data in the predetermined field used to store or encode the data, in this instance, the SSID field (e.g., 1175 of FIG. 15B). In the example, the client (not shown) will see that the sensor data is "BULB OUT", indicating that the light bulb is burned out. In this way, a streetlight fixture, without a network connection of any kind may, through use of passive sensor 1200, transmit sensor data (e.g., 1175 of FIG. 15B) using existing infrastructure, namely, the community of smartphones (e.g., Wi-Fi clients 150) that happen to encounter the Wi-Fi access point (e.g., 110 of FIG. 5) or the dummy Wi-Fi access point (e.g., 1700 of FIG. 16) of passive sensor 1200 and report those encounters.

In one or more embodiments of the present invention, a method of passive sensor tracking with existing infrastructure may include associating, in a sensor tracking database, unique identifying information of a Wi-Fi access point of a passive sensor with a physical property to be sensed by the passive sensor. The unique identifying information may be any information that uniquely identifies the Wi-Fi access point of the passive sensor and is reported by a Wi-Fi client that encounters the Wi-Fi access point, typically as part of location services, but potentially a direct or indirect report. The sensor data may be placed or encoded in one or more fields of the spoofed beacon frame, probe response frame, or other management frame transmitted by the Wi-Fi access point as part of Wi-Fi wireless network discovery. In certain embodiments, the Wi-Fi access point of the passive sensor may be a dummy Wi-Fi access point that does not allow the wireless device to authenticate to, or associate with, the dummy Wi-Fi access point and the dummy Wi-Fi access point does not provide upstream network connectivity.

In certain embodiments, the unique identifying information may be, for example, the BSSID of the Wi-Fi access point of the passive sensor. However, one of ordinary skill in the art will recognize that any field or subfield of the spoofed beacon frame, probe response frame, or other management frame may be used to uniquely identify the Wi-Fi access point, and by association the passive sensor, in accordance with one or more embodiments of the present invention. Notwithstanding the above, to avoid potential overlap or confusion, using the standardized BSSID that are guaranteed to be unique, may provide the simplest solution to uniquely identifying the Wi-Fi access point of the passive sensor.

The method may also include receiving, at the sensor tracking database, sensor data, comprising the physical property sensed by the passive sensor, placed or encoded in the spoofed beacon frame, probe response frame, or other management frame that the passive sensor transmits, as part of Wi-Fi wireless network discovery, to a wireless device that encounters the passive sensor. As noted above, the sensor data may be numeric or alphanumeric, explicit or encoded, and stored in any suitable field or subfield or combination or portions thereof of the spoofed beacon frame, probe response frame, or other management frame, provided it is a field or subfield that is reported by the Wi-Fi client that reports the encounter with the Wi-Fi access point of the passive sensor to a Wi-Fi AP Database or sensor tracking database. The wireless device may report, either directly or indirectly, the unique identifying information of the Wi-Fi access point of the passive sensor encountered and the sensor data encoded in the spoofed beacon frame, probe response frame, or other management frame to a Wi-Fi AP Database, typically as part of location services, or direct or indirect report to sensor tracking database.

In certain embodiments, the sensor data may be received by the sensor tracking database from the wireless device that encounters the passive sensor. In other embodiments, the sensor data may be received by the sensor tracking database from a Wi-Fi AP Database that receives the sensor data from the wireless device that encounters the passive sensor. The Wi-Fi AP Database may comprise a database managed by an original equipment manufacturer, an operating system developer, or a third-party software developer that compiles and makes information relating to reported Wi-Fi access points available to third-parties, typically to enhance location services, but potentially for other uses.

The wireless device may not be required to authenticate to, associate with, or establish a network connection with the Wi-Fi access point or the dummy Wi-Fi access point of the passive sensor. In addition, the wireless device, or user thereof, is not required to knowingly participate in the passive sensor tracking task. The method may optionally include disposing the passive sensor in a location where the physical property is to be sensed. The method may optionally include providing a user access to the sensed physical property of the passive sensor. In one or more embodiments of the present invention, a non-transitory computer readable medium comprising software instructions, when executed by a processor, may perform any of the above-noted methods.

In one or more embodiments of the present invention, a system (e.g., 1600 of FIG. 15C) for passive sensor tracking with existing infrastructure may include a computing system (e.g., 800 of FIG. 8), and a sensor tracking database (e.g., 1610 of FIG. 15C), executing on the computing system (e.g., 800 of FIG. 8), that associates unique identifying information of a Wi-Fi access point (e.g., 110/1700 of FIG. 12) of a passive sensor (e.g., 1200 of FIG. 12) with a physical property to be sensed by the passive sensor (e.g., 1200 of FIG. 12). The Wi-Fi access point (e.g., 110/1700 of FIG. 12) may transmit a spoofed beacon frame (e.g., 1405 of FIG. 14), probe response frame (e.g., 1415 of FIG. 14), or other management frame (e.g., 1300 of FIG. 13) that comprises sensor data (e.g., 1175 of FIG. 13) as part of Wi-Fi wireless network discovery. The unique identifying information may be any information that uniquely identifies the Wi-Fi access point (e.g., 110/1700 of FIG. 12) of the passive sensor (e.g., 1200 of FIG. 12) and is reported by a Wi-Fi client (e.g., 150 of FIG. 15A) that encounters the Wi-Fi access point (e.g., 110/1700 of FIG. 12), typically, but not limited to, as part of location services. The sensor data (e.g., 1175 of FIG. 13) may be placed or encoded in one or more fields of the spoofed beacon frame (e.g., 1405 of FIG. 14), probe response frame (e.g., 1415 of FIG. 14), or other management frame (e.g., 1300 of FIG. 13) transmitted by the Wi-Fi access point (e.g., 110/1700 of FIG. 12) as part of Wi-Fi wireless network discovery. In certain embodiments, the Wi-Fi access point (e.g., 110/1700 of FIG. 12) of the passive sensor (e.g., 1200 of FIG. 12) may be a dummy Wi-Fi access point (e.g., 1700 of FIG. 16) that does not allow the wireless device (e.g., 150 of FIG. 15A) to authenticate to, or associate with, the dummy Wi-Fi access point (e.g., 1700 of FIG. 16) and the dummy Wi-Fi access point (e.g., 1700 of FIG. 16) does not provide upstream network connectivity.

In certain embodiments, the unique identifying information may be, for example, the BSSID (e.g., 1130 of FIG. 13) of the Wi-Fi access point (e.g., 110/1700 of FIG. 12) of the passive sensor (e.g., 1200 of FIG. 12). However, one of ordinary skill in the art will recognize that any field or subfield of the spoofed beacon frame (e.g., 1405 of FIG. 14), probe response frame (e.g., 1415 of FIG. 14), or other management frame (e.g., 1300 of FIG. 13) that is reported may be used to uniquely identify the Wi-Fi access point (e.g., 110/1700 of FIG. 12), and by association the passive sensor, in accordance with one or more embodiments of the present invention. Notwithstanding the above, to avoid potential overlap or confusion, using the standardized BSSID (e.g., 1130 of FIG. 13) that are guaranteed to be unique, may provide the simplest solution to uniquely identifying the Wi-Fi access point (e.g., 110/1700 of FIG. 12) of the passive sensor (e.g., 1200 of FIG. 12).

The sensor tracking database (e.g., 1610 of FIG. 15C) may receive sensor data (e.g., 1175 of FIG. 13), comprising the physical property sensed by the passive sensor (e.g., 1200 of FIG. 12), placed or encoded in the spoofed beacon frame (e.g., 1405 of FIG. 14), probe response frame (e.g., 1415 of FIG. 14), or other management frame (e.g., 1300 of FIG. 13) that the passive sensor (e.g., 1200 of FIG. 12) transmits, as part of Wi-Fi wireless network discovery, to a wireless device (e.g., 150 of FIG. 15A) that encounters the passive sensor (e.g., 1200 of FIG. 12). As noted above, the sensor data (e.g., 1175 of FIG. 13) may be numeric or alphanumeric, explicit or encoded, and stored in any suitable field or subfield or combination or portions thereof of the spoofed beacon frame (e.g., 1405 of FIG. 14), probe response frame (e.g., 1415 of FIG. 14), or other management frame (e.g., 1300 of FIG. 13), provided it is a field or subfield that is reported by the Wi-Fi client (e.g., 150 of FIG. 15A) that reports the encounter with the Wi-Fi access point (e.g., 110/1700 of FIG. 12) of the passive sensor (e.g., 1200 of FIG. 12) directly or indirectly to a Wi-Fi AP Database (e.g., 720 of FIG. 15C) or sensor tracking database (e.g., 1610 of FIG. 15C). The wireless device (e.g., 150 of FIG. 15A) may report, either directly or indirectly, the unique identifying information of the Wi-Fi access point (e.g., 110/1700 of FIG. 12) of the passive sensor (e.g., 1200 of FIG. 12) encountered and the sensor data (e.g., 1175 of FIG. 13) in the spoofed beacon frame (e.g., 1405 of FIG. 14), probe response frame (e.g., 1415 of FIG. 14), or other management frame (e.g., 1300 of FIG. 13) to a Wi-Fi AP Database (e.g., 720 of FIG. 15C), typically as part of location services, or to a sensor tracking database (e.g., 1610 of FIG. 15C).

In certain embodiments, the sensor data (e.g., 1175 of FIG. 13) may be received by the sensor tracking database (e.g., 1610 of FIG. 15C) from the wireless device (e.g., 150 of FIG. 15A) that encounters the passive sensor (e.g., 1200 of FIG. 12). In other embodiments, the sensor data (e.g., 1175 of FIG. 13) may be received by the sensor tracking database (e.g., 1610 of FIG. 15C) from a Wi-Fi AP Database (e.g., 720 of FIG. 15C) that receives the sensor data (e.g., 1175 of FIG. 13) from the wireless device (e.g., 150 of FIG. 15A) that encounters the passive sensor (e.g., 1200 of FIG. 12). The Wi-Fi AP Database (e.g., 720 of FIG. 15C) may comprise a database managed by an original equipment manufacturer, an operating system developer, or a third-party software developer that compiles and makes information relating to reported Wi-Fi access points available to third-parties, typically to enhance location services, but potentially for other reasons as well.

The wireless device (e.g., 150 of FIG. 15A) may not be required to authenticate to, associate with, or establish a network connection with the Wi-Fi access point (e.g., 110/1700 of FIG. 12) of the passive sensor (e.g., 1200 of FIG. 12). In addition, the wireless device (e.g., 150 of FIG. 15A), or user (not shown) thereof, are not required to knowingly participate in the passive sensor tracking task. The system (e.g., 1600 of FIG. 15C) may optionally include the passive sensor (e.g., 1200 of FIG. 12) disposed in a location where the physical property is to be sensed. The system (e.g., 1600 of FIG. 15C) may optionally include providing a user (not shown) access to the sensed physical property of the passive sensor (e.g., 1200 of FIG. 12) via the sensor tracking database (e.g., 1610 of FIG. 15C) or a client portal (e.g., 730 of FIG. 15C) thereof.

Figure 16:
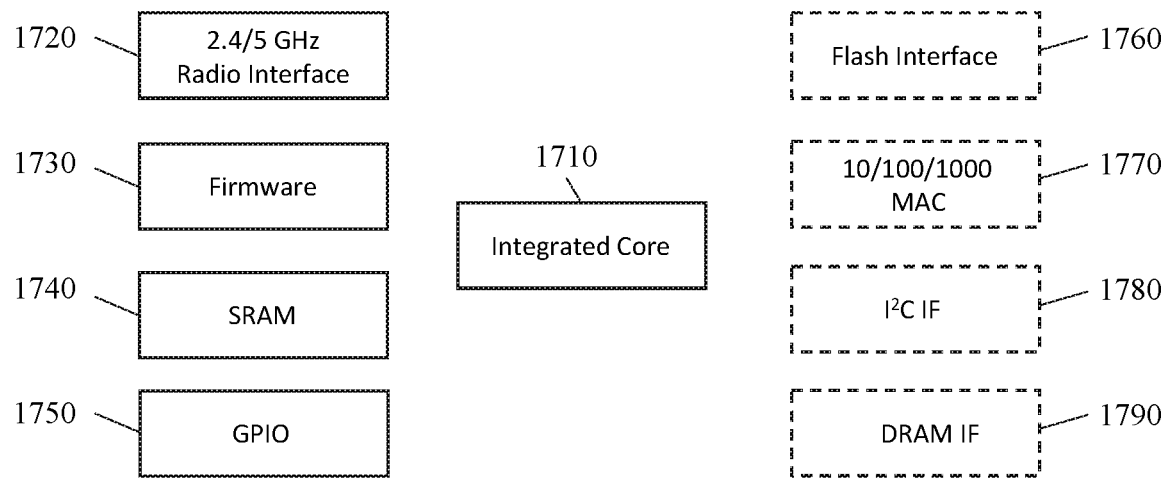
FIG. 16 shows a dummy Wi-Fi access point of a passive sensor in accordance with one or more embodiments of the present invention.

FIG. 16 shows a dummy Wi-Fi access point 1700 of a passive sensor (e.g., 1200 of FIG. 12) in accordance with one or more embodiments of the present invention. Dummy Wi-Fi access point 1700 may spoof certain operations of a bona fide Wi-Fi access point (e.g., 110 of FIG. 5) by participating in at least part of the Wi-Fi wireless network discovery protocol by transmitting spoofed beacon frames, probe response frames, or other management frames that comprise sensor data as discussed above, but is not required to participate in authentication, association, or data transfer. As such, dummy Wi-Fi access point 1700 may include only those features necessary to spoof a bona fide Wi-Fi access point and transmit the sensor data in spoofed beacon frames, probe response frames, or other management frames, without necessarily requiring more.

The reduced complexity of the device allows for greater integration, reduces power, and minimizes the mechanical footprint required for the device. Similar to a conventional Wi-Fi access point, the primary computational engine of the device may be the integrated processing core 1710 that performs the computation and processing tasks, such as, for example a MIPS32® 74K® Core. One of ordinary skill in the art will recognize that the MIPS component referenced is merely exemplary and other integrated cores may be used in accordance with one or more embodiments of the present invention. Firmware 1730, that may be flashable, may store the software instructions executed by the integrated processing core 1710. In addition, Static Random-Access Memory ("SRAM") 1740 may store settings that are loaded at run time or other persistent data. When dummy Wi-Fi access point 1700 broadcasts spoofed beacon frame, probe response frame, or other management frames, integrated processing core 1710 may transmit the data to the radio interface 1720 for putting the data on the antenna (not shown). Other aspects of a conventional Wi-Fi access point, including, but not limited to, a flash interface 1760, a 10/100/1000 MAC interface 1770, an I²C interface, a Dynamic Random Access Memory ("DRAM") interface 1790, and a Universal Asynchronous Receiver/Transmitter ("UART") interface (not shown) among others, may not be included to reduce the complexity of the feature set, reduce power consumption, and minimize the mechanical footprint of the device.

As discussed above, a passive sensor (e.g., 1200 of FIG. 12) may include a sensor portion (e.g., 1210 of FIG. 12) that senses a physical property, a sensor interface (e.g., 1220 of FIG. 12) that receives the output of the sensor portion (e.g., 1210 of FIG. 12) and conveys the sensor data to the integrated processing core 1710 for inclusion in the spoofed beacon frame, probe response, or other management frame. The sensor interface (e.g., 1220 of FIG. 12) may convey the sensor data to the integrated processing core 1710 via General Purpose Inputs/Outputs ("GPIOs") or any other supported means of conveying that data. The firmware 1730 may include some or all of the software that governs the operation of the various components of the dummy Wi-Fi access point 1700. While the role of firmware 1730 in conventional Wi-Fi access points (e.g., 110) is well known to those of ordinary skill in the art, in passive sensor (e.g., 1200) applications, firmware 1730 may coordinate the input of the sensor data (not shown) provided by the sensor interface (e.g., 1220) of the passive sensor (e.g., 1200) and may construct the spoofed management frames (e.g., 1300 of FIG. 13) that comprises sensor data (not shown).

Advantages of one or more embodiments of the present invention may include one or more of the following:

In one or more embodiments of the present invention, a method and system for passive asset tracking with existing infrastructure allows for passively tracking moveable assets by one or more potentially unrelated wireless devices that are in-range of assets broadcasting Wi-Fi signals even though the wireless device, or user thereof, may not even know they are participating in the asset tracking task. In this way, every smartphone in the vicinity of an asset that is desired to be tracked may, anonymously, and without awareness, participate in the asset tracking task.

In one or more embodiments of the present invention, a method and system for passive asset tracking with existing infrastructure leverage already existing devices, systems, and networks to passively track the location of assets without requiring the asset itself to have any connectivity to the Internet or other network connection.

In one or more embodiments of the present invention, a method and system for passive asset tracking with existing infrastructure uses one or more Wi-Fi access points, that do not require connectivity to any particular network, to identify one or more assets in the field using Wi-Fi wireless network discovery and Wi-Fi access point reporting features of modern smartphones and location services to passively identify the location of the one or more assets. The moveable assets may be passively tracked by one or more wireless devices that may be independent and unrelated whenever any one or more of the wireless devices merely come into range of an asset associated with a Wi-Fi access point broadcasting Wi-Fi signals, without any intent or awareness on the part of the wireless device, or user thereof, that they are participating in the asset tracking task due to the nature of the Wi-Fi wireless network discovery protocol.

In one or more embodiments of the present invention, a method and system for passive asset tracking with existing infrastructure leverages existing infrastructure inherent in smartphones, operating systems, and software applications to report their location as well as the unique identifying information of Wi-Fi access points they encounter for improving the accuracy of location-based services for the asset tracking task without their awareness.

In one or more embodiments of the present invention, a method and system for passive asset tracking with existing infrastructure uses the Wi-Fi wireless network discovery protocol as well as the Wi-Fi access point reporting feature of smartphones to passively track assets associated with Wi-Fi access points by one or more wireless devices without requiring that the wireless devices associate with any particular Wi-Fi access point, using publicly accessibly Wi-Fi signals, and in passive scanning applications, completely anonymously with respect to the asset tracking task.

In one or more embodiments of the present invention, a method and system for passive asset tracking with existing infrastructure, a Wi-Fi access point associated with an asset does not require any connectivity to the Internet or any other network connection and does not require a GPS receiver, relying instead on the one or more wireless devices to report the time, date, and relative location of the in-range Wi-Fi access point associated with the asset.

In one or more embodiments of the present invention, a method and system for passive asset tracking with existing infrastructure, an asset tracking database receives unique information identifying and information relating to the location of one or more Wi-Fi access points received directly or indirectly from one or more wireless devices or a Wi-Fi AP Database. The location of the asset may be tracked in the asset tracking database by the location of the Wi-Fi access point.

In one or more embodiments of the present invention, a method and system for passive asset tracking with existing infrastructure may use a Wi-Fi access point that allows for the assignment of alternative meanings to various parts of the beacon frame or probe response corresponding to attributes of the Wi-Fi access point or asset physically and logically associated with it.

In one or more embodiments of the present invention, a method and system for passive asset tracking with existing infrastructure reduces theft by providing a trackable asset without conventional asset tracking hardware or software systems. If the perpetrator of the theft moves a trackable asset within range of any one or more wireless devices, the discovery of the Wi-Fi access point will be reported, and the asset tracking database will be able to locate the associated asset without the perpetrator knowing that the asset has been tracked.

In one or more embodiments of the present invention, a method and system for passive asset tracking with existing infrastructure substantially reduces the complexity and cost associated with deploying a comprehensive asset tracking system. As opposed to conventional asset tracking systems, one or more wireless devices, which may be completely independent of and unrelated to the asset tracking task, serve as the tracking infrastructure.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should be limited only by the appended claims.

What is claimed is:

1. A method of passive sensor tracking with existing infrastructure comprising:
    associating unique identifying information of a Wi-Fi access point of a passive sensor with a physical property to be sensed by the passive sensor, wherein the Wi-Fi access point transmits sensor data in a field of a spoofed beacon frame, probe response frame, or other management frame as part of Wi-Fi wireless network discovery; and
    receiving sensor data, comprising the physical property sensed by the passive sensor, in the spoofed beacon frame, probe response frame, or other management frame transmitted by the Wi-Fi access point, as part of Wi-Fi wireless network discovery, to a wireless device that encounters the passive sensor,
    wherein the wireless device reports, either directly or indirectly, the unique identifying information of the Wi-Fi access point encountered and the sensor data in the spoofed beacon frame, probe response frame, or other management frame to a Wi-Fi AP Database that tracks reported Wi-Fi access points,
    wherein the wireless device is not required to authenticate to, associate with, or establish a network connection with the Wi-Fi access point of the passive sensor, and
    wherein the wireless device, or user thereof, is not required to knowingly participate in the passive sensor tracking task.

2. The method of claim 1, further comprising:
    disposing the passive sensor in a location where the physical property is to be sensed.

3. The method of claim 1, further comprising:
    providing a user access to the sensed physical property of the passive sensor.

4. The method of claim 1, wherein the Wi-Fi access point of the passive sensor is a dummy Wi-Fi access point that does not require the wireless device to authenticate to, or associate with, the dummy Wi-Fi access point and the dummy Wi-Fi access point does not provide upstream network connectivity.

5. The method of claim 1, wherein the unique identifying information comprises a BSSID of the dummy Wi-Fi access point of the passive sensor.

6. The method of claim 1, wherein the sensor data is in a field of the spoofed beacon frame, probe response frame, or other management frame transmitted by the Wi-Fi access point.

7. The method of claim 1, wherein the sensor data is received from the wireless device that encounters the passive sensor.

8. The method of claim 1, wherein the sensor data is received from a Wi-Fi AP Database that receives the sensor data from the wireless device that encounters the passive sensor.

9. The method of claim 7, wherein the Wi-Fi AP Database comprises a database managed by an original equipment manufacturer, an operating system developer, or a third-party software developer that makes information relating to reported Wi-Fi access points available to enhance location services.

10. A non-transitory computer readable medium comprising software instructions that, when executed by a processor, perform a method of passive sensor tracking with existing infrastructure comprising:
  associating unique identifying information of a Wi-Fi access point of a passive sensor with a physical property to be sensed by the passive sensor, wherein the Wi-Fi access point transmits sensor data in a field of a spoofed beacon frame, probe response frame, or other management frame as part of Wi-Fi wireless network discovery; and
  receiving sensor data, comprising the physical property sensed by the passive sensor, in the spoofed beacon frame, probe response frame, or other management frame transmitted by the Wi-Fi access point, as part of Wi-Fi wireless network discovery, to a wireless device that encounters the passive sensor,
  wherein the wireless device reports, either directly or indirectly, the unique identifying information of the Wi-Fi access point encountered and the sensor data in the spoofed beacon frame, probe response frame, or other management frame to a Wi-Fi AP Database that tracks reported Wi-Fi access points,
  wherein the wireless device is not required to authenticate to, associate with, or establish a network connection with the Wi-Fi access point of the passive sensor,
  wherein the wireless device, or user thereof, is not required to knowingly participate in the passive sensor tracking task.

11. The non-transitory computer readable medium of claim 10, further comprising:
  disposing the passive sensor in a location where the physical property is to be sensed.

12. The non-transitory computer readable medium of claim 10, further comprising:
  providing a user access to the sensed physical property of the passive sensor.

13. The non-transitory computer readable medium of claim 10, wherein the Wi-Fi access point of the passive sensor is a dummy Wi-Fi access point that does not require the wireless device to authenticate to, or associate with, the dummy Wi-Fi access point and the dummy Wi-Fi access point does not provide upstream network connectivity.

14. The non-transitory computer readable medium of claim 10, wherein the unique identifying information comprises a BSSID of the dummy Wi-Fi access point of the passive sensor.

15. The non-transitory computer readable medium of claim 10, wherein the sensor data is in a field of the spoofed beacon frame, probe response frame, or other management frame transmitted by the Wi-Fi access point.

16. The non-transitory computer readable medium of claim 10, wherein the sensor data is received from the wireless device that encounters the passive sensor.

17. The non-transitory computer readable medium of claim 10, wherein the sensor data is received from a Wi-Fi AP Database that receives the sensor data from the wireless device that encounters the passive sensor.

18. The non-transitory computer readable medium of claim 17, wherein the Wi-Fi AP Database comprises a database managed by an original equipment manufacturer, an operating system developer, or a third-party software developer that makes information relating to reported Wi-Fi access points available to enhance location services.

19. A system for passive sensor tracking with existing infrastructure comprising:
  a passive sensor comprising:
    a sensor that senses a physical property and outputs a sensor signal comprising sensor data corresponding to the physical property sensed,
    a sensor interface that inputs the sensor signal and generates a spoofed beacon frame, probe response frame, or other management frame comprising sensor data corresponding to the physical property sensed, and
    a Wi-Fi access point that transmits the spoofed beacon frame, probe response frame, or other management frame as part of Wi-Fi wireless network discovery;
  a computing system; and
  a sensor tracking database, executing on the computing system, that associates unique identifying information of the Wi-Fi access point of the passive sensor with a physical property to be sensed by the passive sensor, wherein the Wi-Fi access point transmits a spoofed beacon frame, probe response frame, or other management frame that comprises sensor data as part of Wi-Fi wireless network discovery;
    wherein the sensor tracking database receives sensor data, comprising the physical property sensed by the passive sensor, in the spoofed beacon frame, probe response frame, or other management frame that the passive sensor transmits, as part of Wi-Fi wireless network discovery, to a wireless device that encounters the passive sensor,
  wherein the wireless device reports, either directly or indirectly, the unique identifying information of the Wi-Fi access point encountered and the sensor data in the spoofed beacon frame, probe response frame, or other management frame to the sensor tracking database,
  wherein the wireless device is not required to authenticate or associate with the Wi-Fi access point of the passive sensor.

20. The system of claim 19, wherein the Wi-Fi access point is a dummy Wi-Fi access point that does not require the wireless device to authenticate to, or associate with, the dummy Wi-Fi access point.

21. The system of claim 20, wherein the dummy Wi-Fi access point does not provide connectivity to an upstream network connection.

* * * * *